(12) United States Patent
Araki

(10) Patent No.: US 7,340,752 B2
(45) Date of Patent: Mar. 4, 2008

(54) DISC DRIVING DEVICE AND CAM FOR DISC DRIVING DEVICE

(75) Inventor: Takamasa Araki, Tokyo (JP)

(73) Assignees: Sony Computer Entertainment Inc., Tokyo (JP); Sony Corporation, Tokyo (JP)

( * ) Notice: Subject to any disclaimer, the term of this patent is extended or adjusted under 35 U.S.C. 154(b) by 21 days.

(21) Appl. No.: 11/716,252

(22) Filed: Mar. 9, 2007

(65) Prior Publication Data
US 2007/0180458 A1 Aug. 2, 2007

Related U.S. Application Data

(63) Continuation of application No. 10/931,419, filed on Sep. 1, 2004, now Pat. No. 7,191,454.

(30) Foreign Application Priority Data
Sep. 2, 2003 (JP) ............................. 2003-309534

(51) Int. Cl.
G11B 17/04 (2006.01)
G11B 17/03 (2006.01)

(52) U.S. Cl. ....................... 720/623; 720/608; 720/619; 360/92

(58) Field of Classification Search ................ 720/623, 720/608, 619; 360/92
See application file for complete search history.

(56) References Cited

U.S. PATENT DOCUMENTS

| | | | |
|---|---|---|---|
| 4,674,079 A | 6/1987 | Agostini | 720/623 |
| 4,682,320 A | 7/1987 | D'Alayer de Costemore d'Arc | 720/621 |
| 5,097,460 A | 3/1992 | Camps et al. | 720/621 |
| 5,166,917 A | 11/1992 | Decoster et al. | 720/621 |
| 5,173,894 A | 12/1992 | Kido | 720/623 |
| 5,416,763 A | 5/1995 | Ohsaki | 720/623 |
| 5,561,658 A | 10/1996 | Nakamichi et al. | 720/703 |
| 5,682,369 A | 10/1997 | Nakamichi | 720/620 |
| 5,729,401 A | 3/1998 | Imazaike | 360/92 |
| 5,765,741 A | 6/1998 | Kunze et al. | 226/50 |
| 6,028,831 A | 2/2000 | Scholz et al. | 720/621 |
| 6,147,948 A | 11/2000 | Tanaka et al. | 720/621 |
| 6,222,811 B1 | 4/2001 | Sakurai et al. | 720/620 |
| 6,256,280 B1 | 7/2001 | Sakurai et al. | 720/620 |
| 6,512,730 B1 | 1/2003 | Lee et al. | 720/622 |

(Continued)

Primary Examiner—Angel Castro
Assistant Examiner—Christopher R. Magee
(74) Attorney, Agent, or Firm—Frommer Lawrence & Haug LLP; William S. Frommer

(57) ABSTRACT

In a disc driving device that performs loading operation to transfer a disc, which is a disc-shaped storage medium, in its radial direction, and chucking operation to transfer the disc substantially in the direction of the thickness, the loading operation and the chucking operation are to be performed by a single driving source, and miniaturization and reduction in thickness or the like of the device are to be realized easily. The disc driving device has roller arm parts that sway parallel to the radial direction of a disc, a chucking arm part that sways substantially in the direction of the thickness of the disc, and a cam. The cam has a cam groove for regulating swaying of the roller arm parts so as to position the disc transferred in the radial direction at a predetermined position, and a cam groove for regulating swaying of the chucking arm part so as to transfer the disc situated at the predetermined position substantially into the direction of the thickness.

11 Claims, 22 Drawing Sheets

U.S. PATENT DOCUMENTS 6,817,022 B1 * 11/2004 Taniguchi et al. .......... 720/623
6,826,766 B2 * 11/2004 Tuchiya ...................... 720/620
6,983,470 B2 *  1/2006 Suzuki ....................... 720/620
6,983,471 B2 *  1/2006 Suzuki ....................... 720/620
7,007,285 B2 *  2/2006 Suzuki ....................... 720/621
7,076,790 B2 *  7/2006 Satoh ......................... 720/604

* cited by examiner

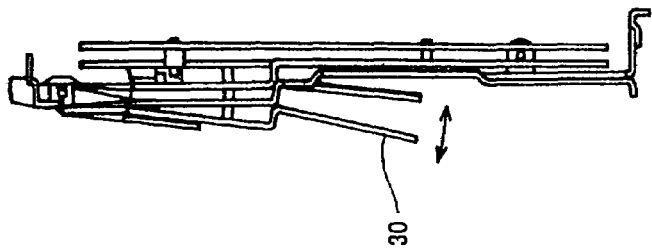
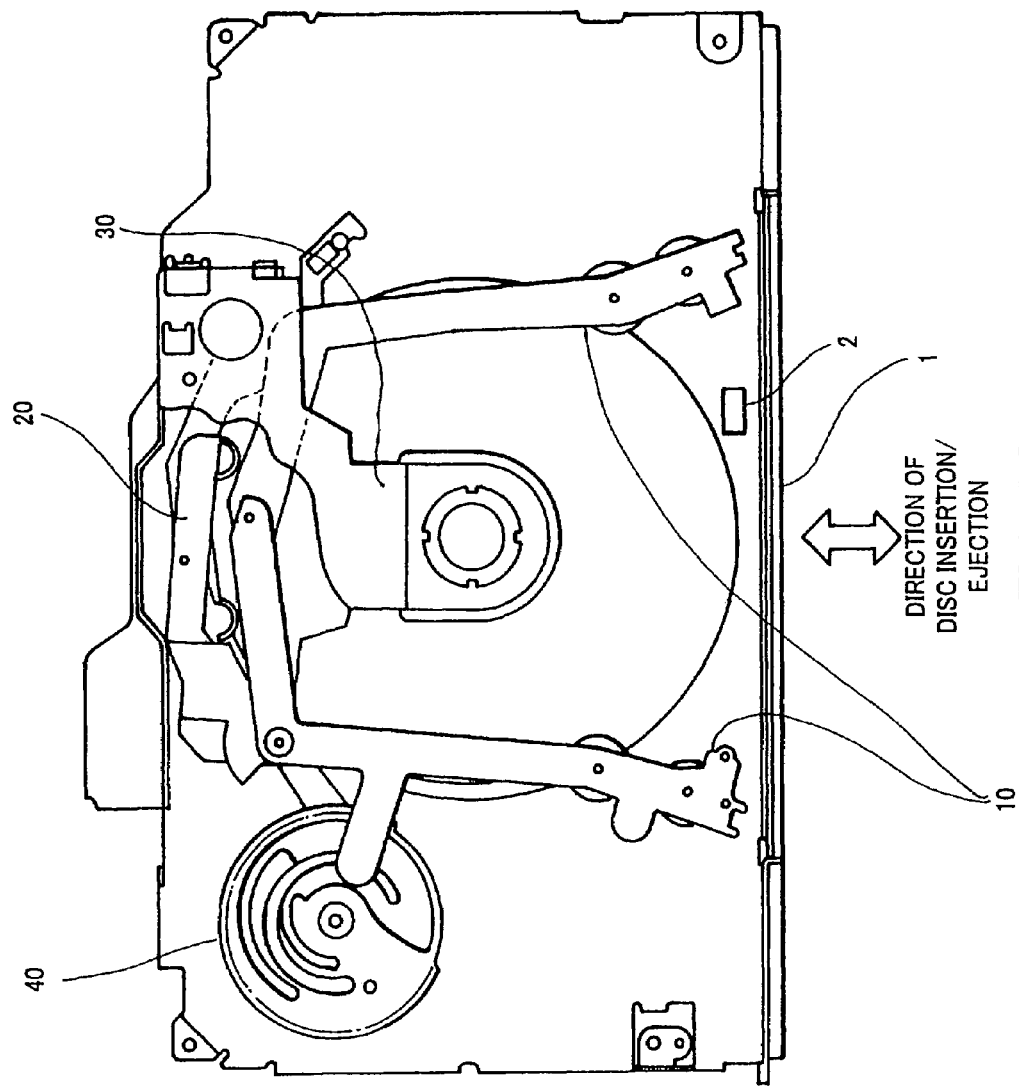
FIG.1B
FIG.1A
DIRECTION OF DISC INSERTION/ EJECTION

DISC DRIVING DEVICE AND CAM FOR DISC DRIVING DEVICE

This is a continuation of application Ser. No. 10/931,419, filed Sep. 1, 2004, now U.S. Pat. No. 7,191,454, with a claim of priority under 35 USC 119 to Japanese Application 2003-309534, filed in Japan on Sep. 2, 2003, the entirety thereof being incorporated herein by reference.

BACKGROUND OF THE INVENTION

1. Field of the Invention

This invention relates to a disc driving device that handles a disc-shaped storage medium such as an optical disc or magneto-optical disc, and a cam for disc driving device.

This application claims priority of Japanese Patent Application No. 2003-309534, filed on Sep. 2, 2003, the entirety of which is incorporated by reference herein.

2. Description of the Related Art

Generally, many information devices such as personal computers and home game machines use optical discs like compact discs (CDs) and digital versatile disks (DVDs) or magneto-optical discs (MOs) as storage media and therefore have disc driving devices for reading information from the disc-shaped storage media and writing information onto the discs.

A disc driving device has a spindle mechanism for rotating a disc and a pickup mechanism for reading and writing information, and realizes reading of information from a disc and writing of information to the disc by these mechanisms. In addition to these spindle mechanism and pickup mechanism, the disc driving device also has a loading mechanism for performing loading operation to transfer a disc in its radial direction, and a chucking mechanism for performing chucking operation to transfer the disc substantially in the direction of its thickness. The loading mechanism performs the disc loading operation between a disc insertion/ejection port and the spindle mechanism. The chucking mechanism performs the chucking operation to the disc loaded to the position of the spindle mechanism.

Such loading operation and chucking operation are realized usually by using separate driving sources, respectively, because these operations transfer a disc in different directions. That is, the conventional disc driving device separately has a driving source for loading operation and a driving source for chucking operation (see, for example, Patent Reference 1).

Patent Reference 1: Japanese Patent Application Laid-Open No. 2002-304799

Meanwhile, recently, miniaturization and reduction in thickness or the like of information devices having disc driving devices have been strongly demanded. In this circumstance, the disc driving devices, too, must be necessarily miniaturized and reduced in thickness or the like.

However, the conventional disc driving device has separate driving sources for loading operation and for chucking operation are provided. This is not necessarily suitable for miniaturization and reduction in thickness or the like.

SUMMARY OF THE INVENTION

Thus, it is an object of this invention to provide a disc driving device and a cam for disc driving device that enable disc loading operation and chucking operation with a single driving source, and thereby easily realize miniaturization and reduction in thickness or the like of the device, and also enables reduction in the number of components by the use of a common driving source.

A disc driving device according to this invention is proposed for achieving the above-described object. Specifically, the disc driving device according to this invention has a function of performing loading operation to transfer a disc, which is a disc-shaped recording medium, in its radial direction, and chucking operation to transfer the disc substantially in the direction of its thickness. The disc driving device has: plural roller members that contact an outer circumference of the disc and thus support the disc; a roller arm that sways parallel to the radial direction of the disc and has the roller members arranged at its swaying end; a chucking member engaged with a center hole of the disc; a chucking arm that sways substantially in the direction of the thickness of the disc and has the chucking member arranged at its swaying end; a single driving source that gives rotational driving force to at least one of the plural roller members; and a cam driven by the single driving source and having provided thereon a centering cam groove or cam ridge for regulating the swaying of the roller arm and a chucking cam groove or cam ridge for regulating the swaying of the chucking arm; wherein as the centering cam groove or cam ridge regulates the swaying of the roller arm, the disc transferred in the radial direction by rotational driving of the roller members is positioned at a predetermined position, and as the chucking cam groove or cam ridge regulated the swaying of the chucking arm, the disc situated at the predetermined position is transferred substantially in the direction of the thickness by the chucking member.

A cam for disc driving device according to this invention is proposed for achieving the above-described object. Specifically, the cam for disc driving device is used in a disc driving device having: plural roller members that contact an outer circumference of a disc, which is a disc-shaped recording medium, and thus support the disc; a roller arm that sways parallel to a radial direction of the disc and has the roller members arranged at its swaying end; a chucking member engaged with a center hole of the disc; a chucking arm that sways substantially in the direction of thickness of the disc and has the chucking member arranged at its swaying end; and a single driving source that gives rotational driving force to at least one of the plural roller members; the disc driving device having a function of performing loading operation to transfer the disc and chucking operation to transfer the disc substantially in the direction of its thickness. The cam for disc driving device is driven by the single driving source and has provided thereon a centering cam groove or cam ridge for regulating the swaying of the roller arm and a chucking cam groove or cam ridge for regulating the swaying of the chucking arm. As the centering cam groove or cam ridge regulates the swaying of the roller arm, the disc transferred in the radial direction by rotational driving of the roller members is positioned at a predetermined position, and as the chucking cam groove or cam ridge regulated the swaying of the chucking arm, the disc situated at the predetermined position is transferred substantially in the direction of the thickness by the chucking member.

In the disc driving device of the above-described structure and the disc driving device using the can for disc driving device, the disc supported by the roller member is transferred in its radial direction (for example, in the same direction as the direction of insertion/ejection of the disc) by the rotational driving force given to at least one of the roller members from the driving source. In this case, since the disc supporting position by the roller members is changed by the transfer of the disc, the roller arm having the roller members arranged thereon sways parallel to the radial direction of the disc. This means that when the swaying is regulated, the transfer of the disc is regulated, too. Therefore, as the swaying of the roller arm is regulated by the centering cam groove or cam ridge provided on the cam, the disc transferred in the radial direction is positioned at the predetermined position. In short, in the disc driving device of the above-described structure, disc loading operation is performed through rotational driving of the roller members and regulation of the swaying of the roller arm by the cam.

Moreover, in the disc driving device of the above-described structure, the chucking cam groove or cam ridge is provided on the cam and the chucking cam groove or cam ridge regulates the swaying of the chucking arm. The chucking arm thus transfers the disc situated at the predetermined position substantially into the direction of the thickness by the chucking member. In short, in the disc driving device of the above-described structure, disc chucking operation is performed through regulation of the swaying of the chucking arm by the cam.

Both the roller members and the cam are driven by the single driving source. Therefore, in the disc driving device of the above-described structure, the disc loading operation and the disc chucking operation are performed as a series of operations by the single driving source (same driving source).

In the disc driving device according to this invention and the disc driving device using the cam for disc driving device according to this invention, since the disc loading operation and the disc chucking operation can be performed as a series of operations by the single driving source, separate driving sources for loading operation and for chucking operation need not be provided and miniaturization and reduction in thickness or the like of the device can be easily realized. Moreover, since the common driving source can be used for the loading operation and the chucking operation, reduction in the number of components can be realized and reduction in cost as well as miniaturization and reduction in thickness can be easily realized.

BRIEF DESCRIPTION OF THE DRAWINGS

FIGS. 1A and 1B are explanatory views showing a schematic structure of a disc driving device according to this invention. FIG. 1A is a plan view thereof. FIG. 1B is a side sectional view thereof.

FIG. 5A shows an exemplary structure of the face side. FIG. 5B shows an exemplary structure of the rear side. FIG. 5C is a sectional view showing a part along line A-A in FIG. 5A.

DESCRIPTION OF THE PREFERRED EMBODIMENTS

Figure 2:
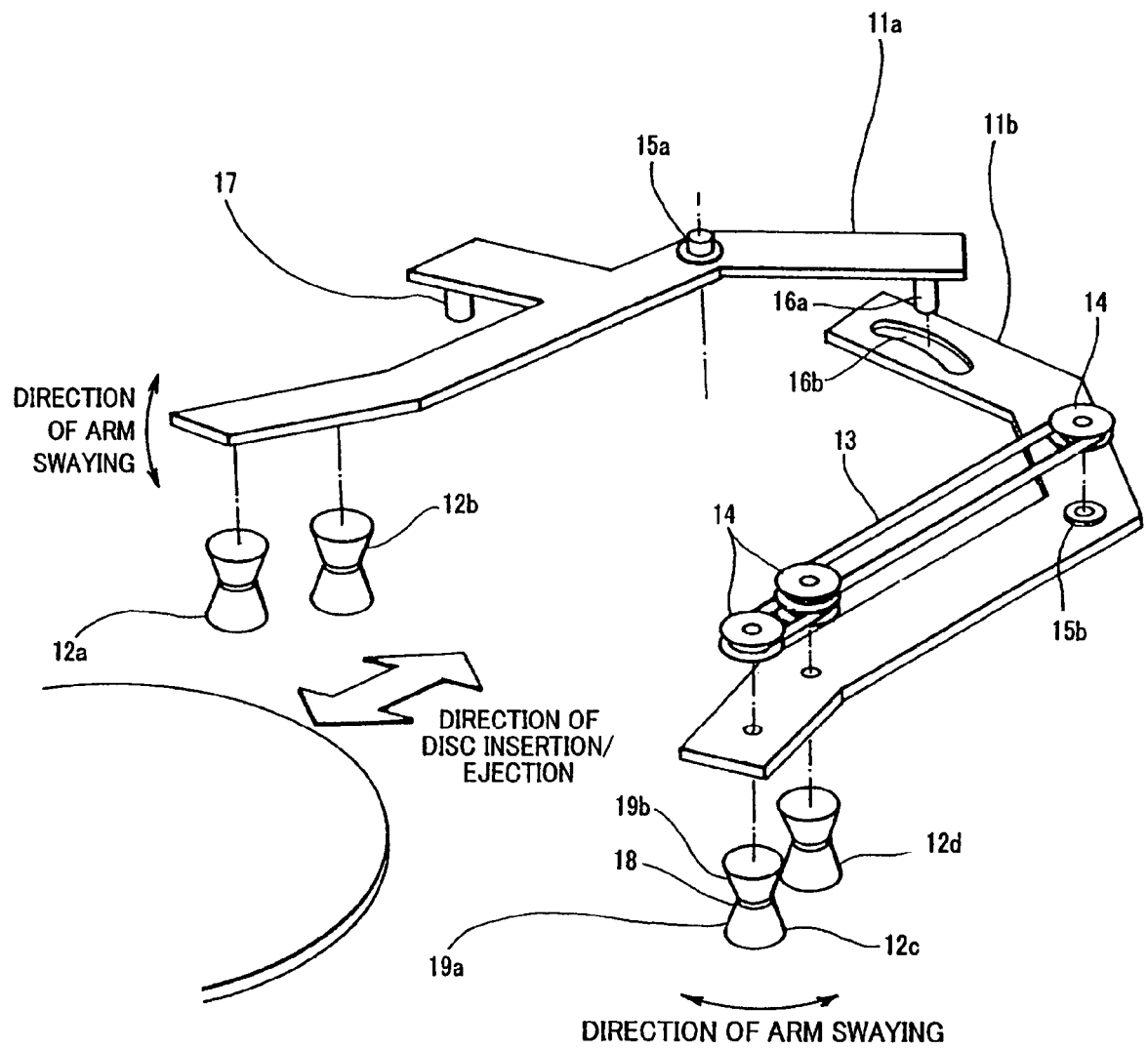
FIG. 2 is an exploded perspective view showing an exemplary structure of a first roller arm part in the disc driving device shown in FIGS. 1A and 1B.

The disc driving device and the cam for disc driving device according to this invention will now be described with reference to the drawings.

Here, the function of performing loading operation and the function of performing chucking operation will be described, which are characteristic features of the disc driving device according to this invention. In other words, its spindle mechanism and pickup mechanism for reading information from a disc and/or writing information to the disc are substantially similar to those of the conventional device and therefore will not be described further in detail.

First, a disc handled by the disc driving device will be briefly described. The disc is a read-only storage medium such as CD or DVD, or a recordable/reproducible storage medium such as CD-R or DVD-R. The disc is formed in a disc-shape and has a center hole provided substantially at its central part. As for the outer diameter of the disc, plural sizes exist. Specifically, there are discs having a diameter of 12 cm (hereinafter referred to as "12-cm disc") and disc having a diameter of 8 cm (hereinafter referred to as "8-cm disc").

A schematic structure of the disc driving device that handles such a disc will now be described.

FIGS. 1A and 1B are explanatory views showing the schematic structure of the disc driving device according to this invention. As shown in FIGS. 1A and 1B, schematically, the disc driving device has a disc insertion/ejection port 1 for inserting and ejecting a disc, a photoelectric sensor 2 for detecting insertion of the disc into the disc insertion/ejection port 1, a first roller arm part 10, a second roller arm part 20, a chucking arm part 30, a cam 40, and a single driving source (not shown) made up of, for example, a pulse motor. The first roller arm part 10, the second roller arm part 20, the chucking arm part 30 and the cam 40 will now be described in order.

FIG. 2 is an exploded perspective view showing an exemplary structure of the first roller arm part 10. As shown in FIG. 2, the first roller arm part 10 has a pair of roller arms 11a, 11b, plural roller members 12a to 12d, and a belt 13 and a pulley 14 for transmitting rotational driving force from the driving source to the roller members 12c, 12d.

The pair of roller arms 11a, 11b is made of, for example, metal plates or molded resin. The roller arms 11a, 11b sway about supporting points 15a, 15b as their respective fulcrums. The swaying direction is parallel to the radial direction of the disc inserted into the disc insertion/ejection port 1 and substantially orthogonal to the direction of insertion/ejection of the disc. An engagement pin 16a is provided protruding from one roller arm 11a, and an arcuate oblong 16b engaged with the engagement pint 16a is provided on the other roller arm 11b. Since the engagement pin 16a, the oblong 16b and the supporting points 15a, 15b form a link mechanism, the pair of roller arms 11a, 11b sway while symmetrically synchronizing with each other with reference to the center of the disc inserted into the disc insertion/ejection port 1. On the one roller arm 11a, a guide boss 17 to be engaged with a cam groove provided on the cam 40, which will be described later, is provided.

The plural roller members 12a to 12d are made of, for example, a resin material having high self-lubricating property, and are arranged at swaying ends of the roller arms 11a, 11b. The purpose of arranging two roller members each, 12a to 12d, at the swaying ends of the roller arms 11a, 11b is to cope with two types of discs having different diameters (12-cm disc and 8-cm disc), as will be later described in detail. Therefore, the arrangement pitch of the roller members 12a, 12c is different from the arrangement pitch of the roller members 12b, 12d.

On each of the roller members 12a to 12d, a circumferential part 18 is provided which contacts the outer circumference of the disc inserted into the disc insertion/ejection port 1 and thus supports the disc. It is desired that, for example, a rubber material should be attached to the circumferential part 18 in order to increase the coefficient of friction with the outer circumferential end surface of the disc. Above and below the circumferential part 18 in the axial direction, tapered parts 19a, 19b having diameters increasing as they are away from the circumferential part 18, are provided. These tapered parts 19a, 19b guide the outer circumferential end part of the disc so that the outer circumferential end part of the disc can be securely supported by the circumferential part 18. Of the tapered parts 19a, 19b, the tapered part 19a provided on the non-roller arm side functions as a skirt part for guide in the case of disc chucking operation, as will be described later.

Of such roller members 12a to 12d, both the roller members 12c, 12d arranged on the roller arm 11b are rotatably supported and are rotationally driven in the same direction by rotational driving force transmitted by the belt 13 and the pulley 14. The belt 13 and the pulley 14 may be replaced by, for example, a combination of plural gears as long as they can transmit the rotational driving force.

On the other hand, the roller members 12a, 12b arranged on the roller arm 11a are fixedly provided without rotating, unlike the roller members 12c, 12d. However, the roller members 12c, 12d may be rotatably supported. Since these roller members need not rotate, a single roller member of flat elliptic shape equivalent to integrated two roller members may be provided instead of providing the two roller members in parallel.

Figure 3:
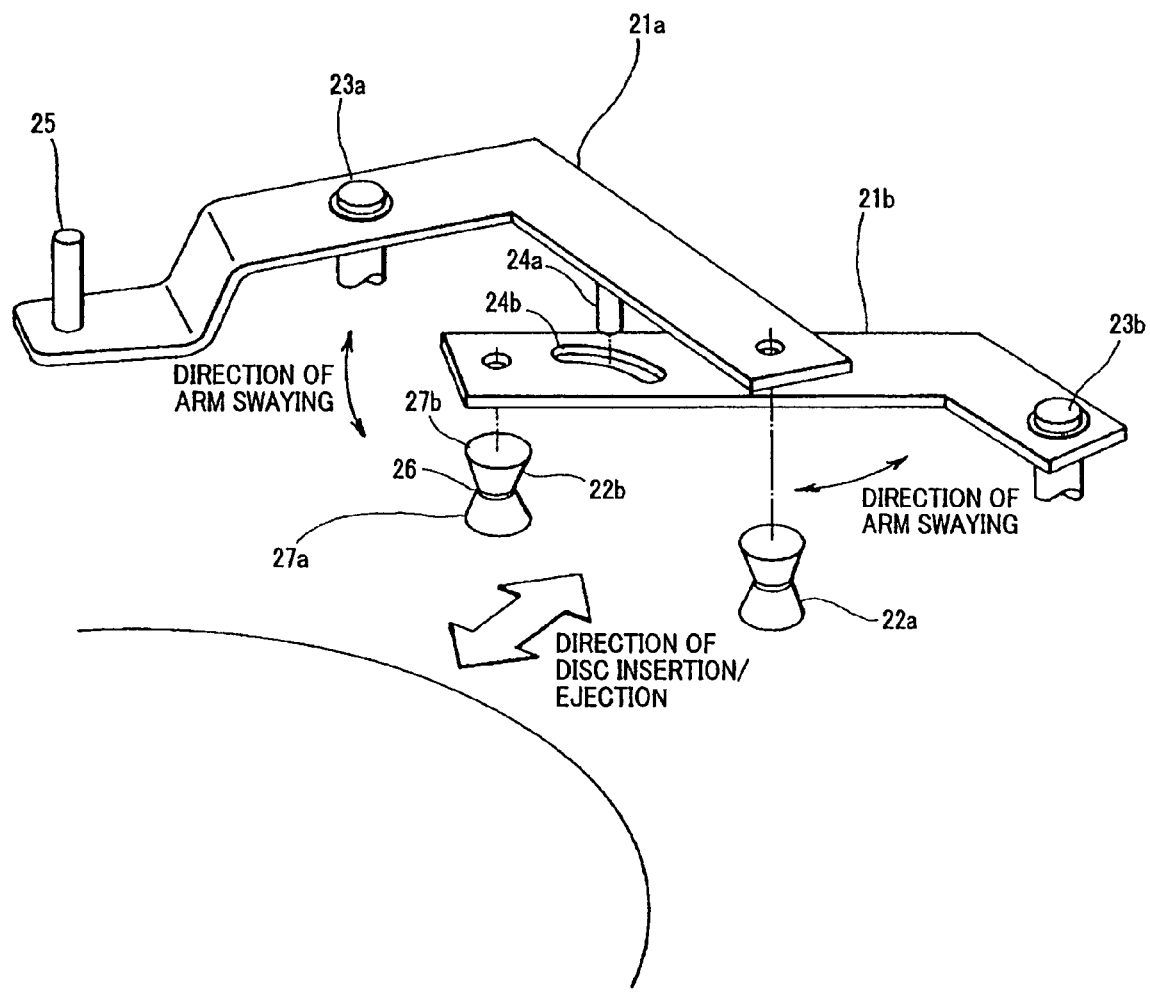
FIG. 3 is an exploded perspective view showing an exemplary structure of a second roller arm part in the disc driving device shown in FIGS. 1A and 1B.

FIG. 3 is an exploded perspective view showing an exemplary structure of the second roller arm part 20. As shown in FIG. 3, the second roller arm part 20 has a pair of roller arms 21a, 21b, and roller members 22a, 22b.

The pair of roller arms 21a, 21b is made of, for example, metal plates or molded resin, and they sway parallel to the radial direction of the disc about supporting points 23a, 23b as their respective fulcrums, similarly to the roller arms 11a, 11b in the first roller arm part 10. An engagement pint 24a provided protruding from one roller arm 21a is engaged with an oblong 24b provided on the other roller arm 21b, and the engagement pin 24a, the oblong 24b and the supporting points 23a, 23b of the roller arms 21a, 21b form a link mechanism. Thus, the roller arms 21a, 21b sway substantially symmetrically synchronizing with each other with reference to the center of the disc inserted into the disc insertion/ejection port 1. A guide boss 25 to be engaged with the cam groove provided on the cam 40, which will be described later, is provided protruding from the one roller arm 21a.

The roller members 22a, 22b are made of, for example, a resin material having high self-lubricating property, similarly to the roller members 12a, 12b in the first roller arm part 10. The roller members 22a, 22b are rotatably or fixedly arranged at swaying ends of the roller arms 21a, 21b, respectively. Each of the roller members 22a, 22b has a circumferential part 26 that contacts the outer circumference of the disc inserted into the disc insertion/ejection port 1 and thus supports the disc. Again, it is desired that, for example, a rubber material should be attached to the circumferential part 26 in order to increase the coefficient of friction with the outer circumferential end surface of the disc. Above and below the circumferential part 26 in the axial direction, tapered parts 27a, 27b having diameters increasing as they are away from the circumferential part 26, are provided. These tapered parts 27a, 27b guide the outer circumferential end part of the disc so that the outer circumferential end part of the disc can be securely supported by the circumferential part 26. Of the tapered parts 27a, 27b, the tapered part 27a provided on the non-roller arm side functions as a skirt part for guide in the case of disc chucking operation, as will be described later.

Figure 4:
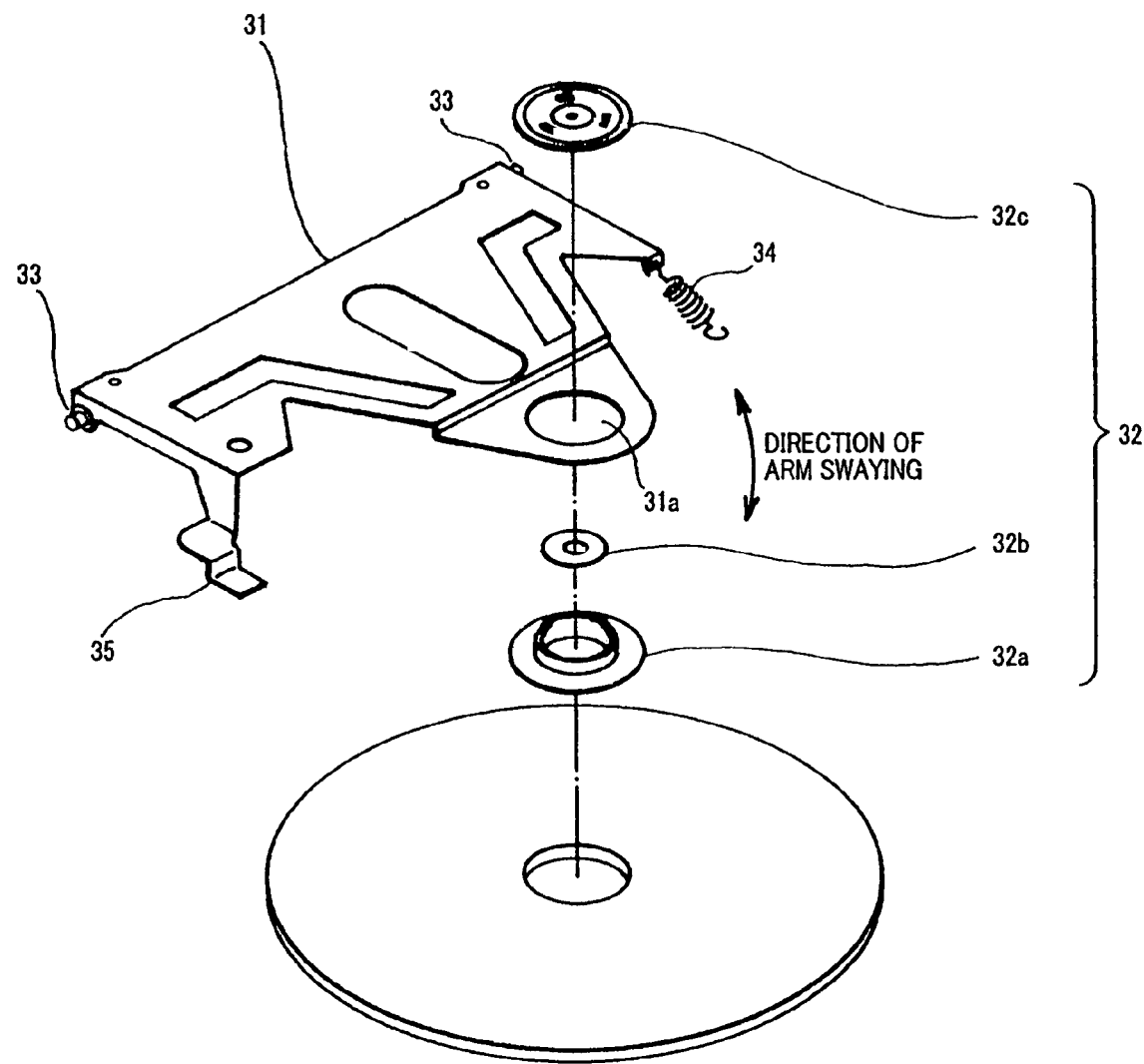
FIG. 4 is an exploded perspective view showing an exemplary structure of a chucking arm part in the disc driving device shown in FIGS. 1A and 1B.

FIG. 4 is an exploded perspective view showing an exemplary structure of the chucking arm part 30. As shown in FIG. 4, the chucking arm part 30 has a chucking arm 31, and a chucking member 32 including a chucking plate 32a, a yoke 32b and a yoke pad 32c.

The chucking arm 31 is made of, for example, a metal plate or molded resin, and sways substantially in the direction of the thickness of the disc inserted into the disc insertion/ejection port 1, about a supporting point 33 as its fulcrum. The chucking arm 31 is energized toward the spindle mechanism of the disc driving device by an elastic member 34 made of, for example, a tension spring. On the chucking arm 31, a guide piece 35 to be engaged with the cam groove provided on the cam 40, which will be described later, is provided.

The chucking member 32 includes the chucking plate 32a of a shape that can be engaged with the center hole of the disc, the disc-shaped yoke 32b made of a magnetic material, and the yoke pad 32c for retaining the chucking plate 32a and the yoke 32b through an opening 31a provided at the swaying end of the chucking arm 31. That is, the chucking member 32 is arranged at the swaying end of the chucking arm 31 and can be engaged with the center hole of the disc.

Figure 5B:
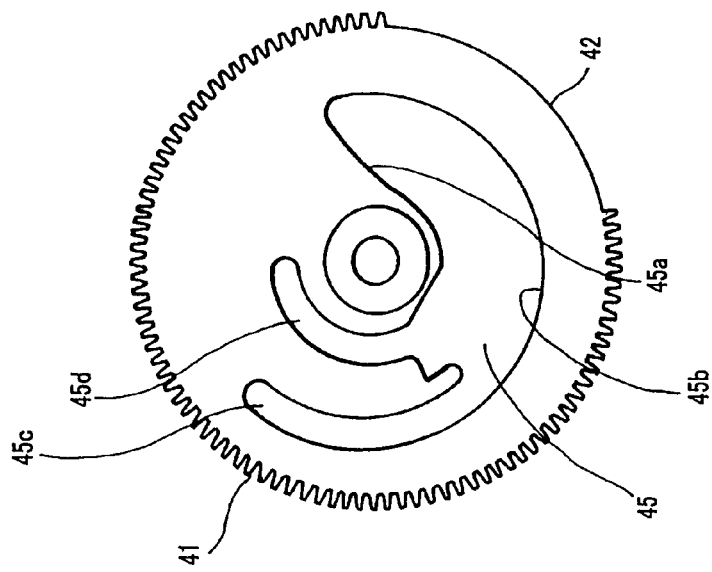
FIGS. 5A to 5C are explanatory views showing an exemplary structure of a cam in the disc driving device shown in FIGS. 1A and 1B.
Figure 5A:
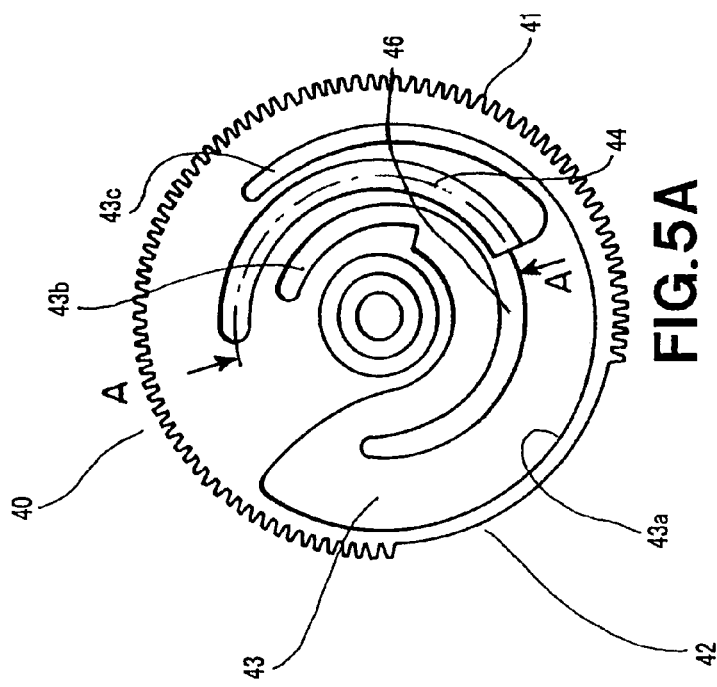
Figure 5C:
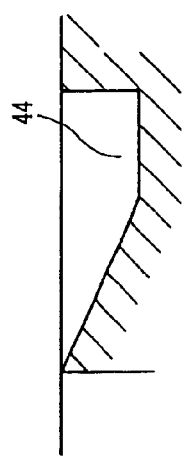

FIGS. 5A to 5C are explanatory views showing an exemplary structure of the cam 40. The cam 40 is made of, for example, a resin material having high self-lubricating property and is rotatably supported. As shown in FIGS. 5A and 5B, the cam 40 has a flat gear-shape having cogs 41 provided on its outer circumference. However, the cogs 41 are not formed on the entire outer circumference and a cog-lacking part 42 is provided in a part of the outer circumference. A gear (not shown) rotationally driven by the driving source that transmits rotational driving force to the belt 13 and the pulley 14 is to be engaged with the cogs 41.

As shown in FIG. 5A, a cam groove 43 to be engaged with the guide boss 17 protruding from the roller arm 11a forming the first roller arm part 10 is formed on one side (hereinafter referred to as "face side") of the cam 40. As the guide boss 17 is engaged with the cam groove 43, the swaying of the roller arms 11a, 11b of the first roller arm part 10 is regulated. The cam groove 43 includes a 12-cm disc centering cam groove part 43a, a 12-cm disc chucking cam groove part 43b, and an 8-cm disc chucking cam groove part 43c in order to realize the regulating function, which will be described later. That is, the cam groove 43 provided on the face side of the cam 40 includes the plural cam groove parts 43a to 43c corresponding to the different disc diameters.

Moreover, on the face side of the cam 40, a chucking cam groove 44 to be engaged with the guide piece 35 provided on the chucking arm 31 forming the chucking arm part 30 is formed. As the guide piece 35 is engaged with the chucking cam groove 44, the swaying of the chucking arm 31 of the chucking arm part 30 is regulated.

As shown in FIG. 5B, a cam groove 45 to be engaged with the guide boss 25 protruding from the roller arm 21a forming the second roller arm part 20 is formed on the other side (hereinafter referred to as "rear side") of the cam 40. As the guide boss 25 is engaged with the cam groove 45, the swaying of the roller arms 21a, 21b of the second roller arm part 20 is regulated. The cam groove 45 includes a cam operation trigger cam groove part 45a, a 12-cm disc centering cam groove part 45b, a 12-cm disc chucking cam groove part 45c, and an 8-cm disc chucking cam groove part 45d in order to realize the regulating function, which will be described later. That is, also the cam groove 45 provided on the rear side of the cam 40 includes the plural cam groove parts 45a to 45d corresponding to the different disc diameters.

While the cam grooves 43, 44 and 45 are formed on the cam 40 in this example, cam ridges may be provided instead of the cam grooves, as long as they can realize an equivalent cam function.

Next, an exemplary processing operation in performing disc loading operation and disc chucking operation in the disc driving device of the above-described structure will be described separately for a 12-cm disc and for an 8-cm disc.

Figure 6:
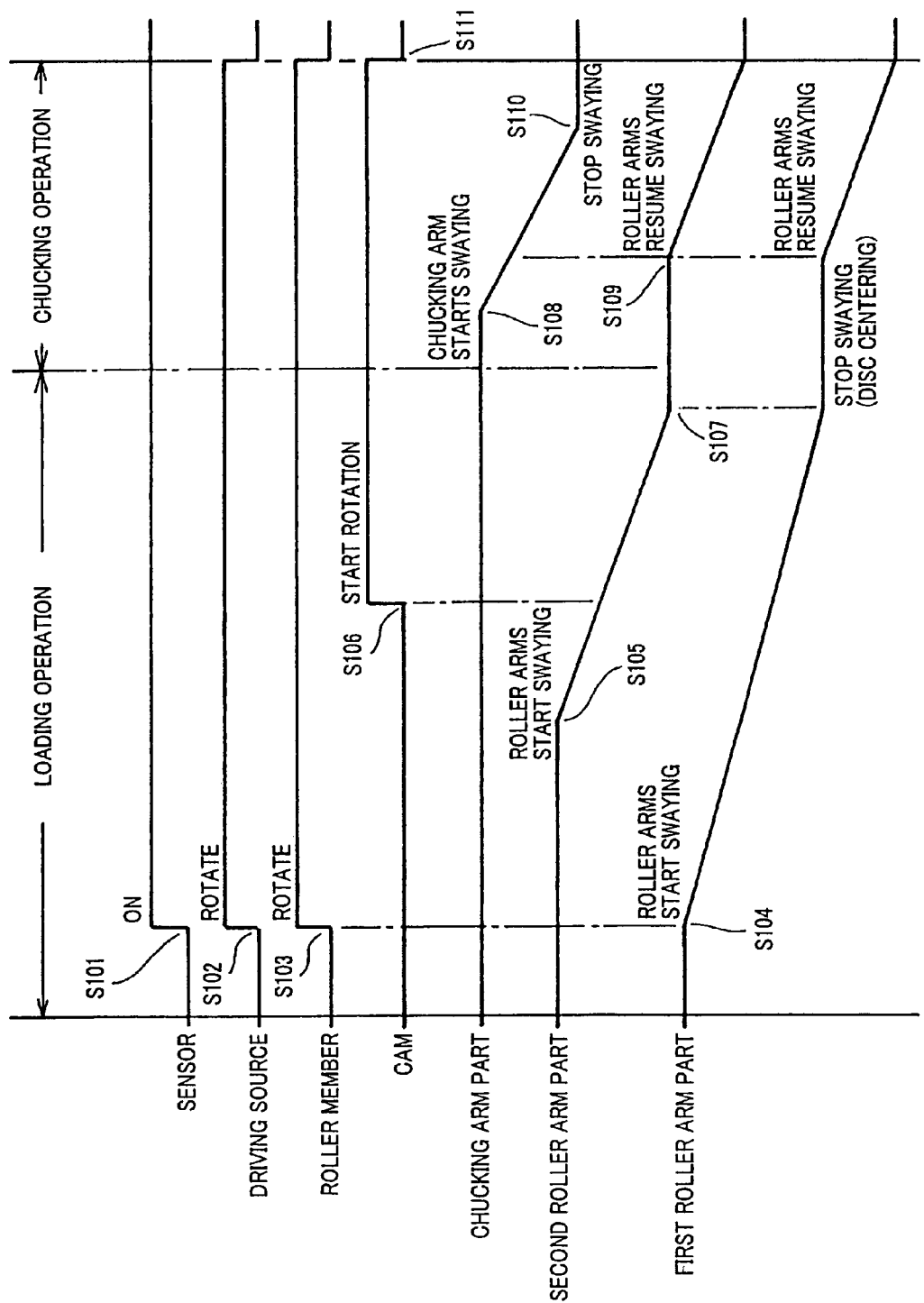
FIG. 6 is a timing chart showing an exemplary processing operation in the case of performing loading operation of a 12-cm disc inserted in a disc insertion/ejection port and then performing chucking operation, in the disc driving device shown in FIGS. 1A and 1B.

First, the case of a 12-cm disc will be described. FIG. 6 is a timing chart showing an exemplary processing operation in performing loading operation of the 12-cm disc inserted in the disc insertion/ejection port 1 and then performing chucking operation. FIGS. 7 to 12 are explanatory views showing exemplary operations of the roller arm parts and the cam in the loading operation of the 12-cm disc. In FIGS. 7 to 12, the roller arms 11b, 21b that sway symmetrically synchronizing with the roller arms 11a, 21a are not shown.

As shown in FIG. 6, in the disc driving device, when the 12-cm disc is manually inserted into the disc insertion/ejection port 1, the photoelectric sensor 2 detects the insertion of the disc (step 101, hereinafter step is referred to simply as "S"). In response to this, the driving source starts rotational driving (S102). The rotational driving force of the driving source is transmitted through the belt 13 and the pulley 14, and the rotatably supported roller members 12c, 12d start rotating (S103).

As the driving source starts rotational driving, also the gear to be meshed with the cogs 41 of the cam 40 starts rotating. At this point, the cog-lacking part 42 is situated at the gear part, and the gear and the cogs are not meshed with each other. Therefore, only the gear idles. That is, even when the driving source starts rotational driving, this does not start rotation of the cam 40.

The outer circumferential end part of the 12-cm disc inserted in the disc insertion/ejection port 1 is abutted against the circumferential parts 18 of the roller members 12a, 12c arranged corresponding to the 12-cm disc, of the roller members 12a to 12d of the first roller arm part 10, and the disc is supported by the circumferential parts 18. In this case, since the 12-cm disc is formed in a disc-shape, if the roller member 12c is rotating, the 12-cm disc rotates about a supporting point made by the fixed roller member 12a as its fulcrum. As the 12-cm disc rotates, this changes the supporting positions by the roller members 12a, 12c. Therefore, the pair of roller arms 11a, 11b sways symmetrically synchronizing with each other with reference to the center of the 12-cm disc (S104). These actions cause the 12-cm disc to be transferred in the radial direction with reference to its center, from the disc insertion/ejection port 1 toward the spindle mechanism. That is, the loading operation of the 12-cm disc is started.

The start of rotational driving of the driving source in such loading operation is triggered by the detection of disc insertion by the photoelectric sensor 2. Therefore, when the outer circumferential end part of the 12-cm disc is abutted against the roller members 12a, 12c, the roller member 12c can be already rotating and the impact of abutment against the roller members 12a, 12c at the time of disc insertion/ejection can be reduced. That is, when the disc inserted into the disc insertion/ejection port 1, the disc is automatically pulled inward. Such good operability for a person who inserts the disc can be realized.

After that, as the driving source continues rotational driving and the transfer of the 12-cm disc in the radial direction is continued, the outer circumferential end part of the 12-cm disc is supported by the roller members 12b, 12d of the first roller arm part 10 and is abutted against the circumferential parts of the roller members 22a, 22b of the second roller arm part 20. Then, as the transfer of the 12-cm disc in the radial direction is still continued by the rotational driving of the driving source after the abutment, the roller members 22a, 22b are pressed toward the transfer direction by the outer circumferential end part of the 12-cm disc. This causes the pair of roller arms 21a, 21b to sway synchronizing substantially symmetrically with reference to the center of the 12-cm disc (S105).

Figure 7:
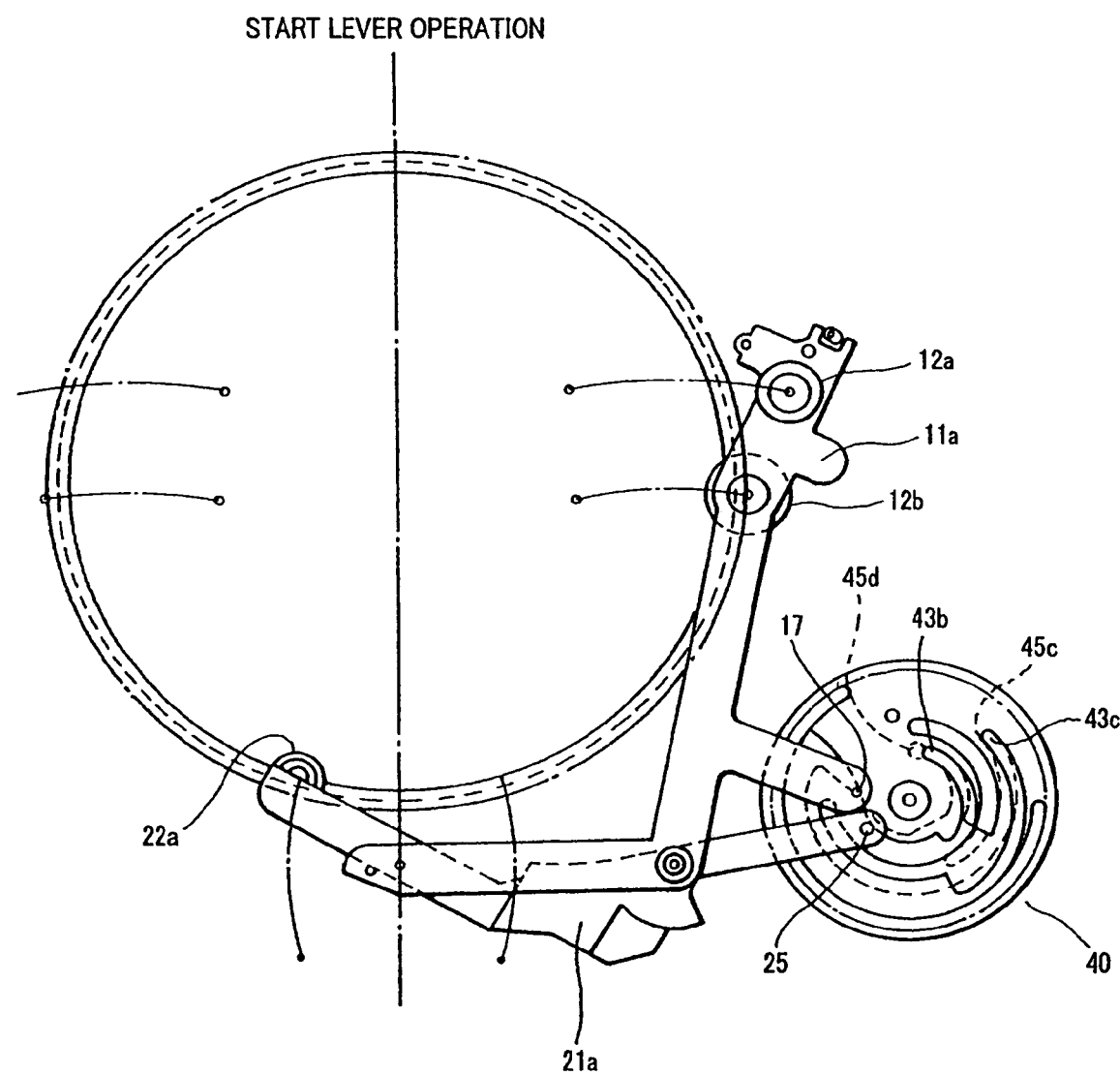
FIG. 7 is an explanatory view (part 1) showing an exemplary operation of the roller arm parts and the cam in the loading operation of the 12-cm disc, in the disc driving device shown in FIGS. 1A and 1B.
Figure 8:
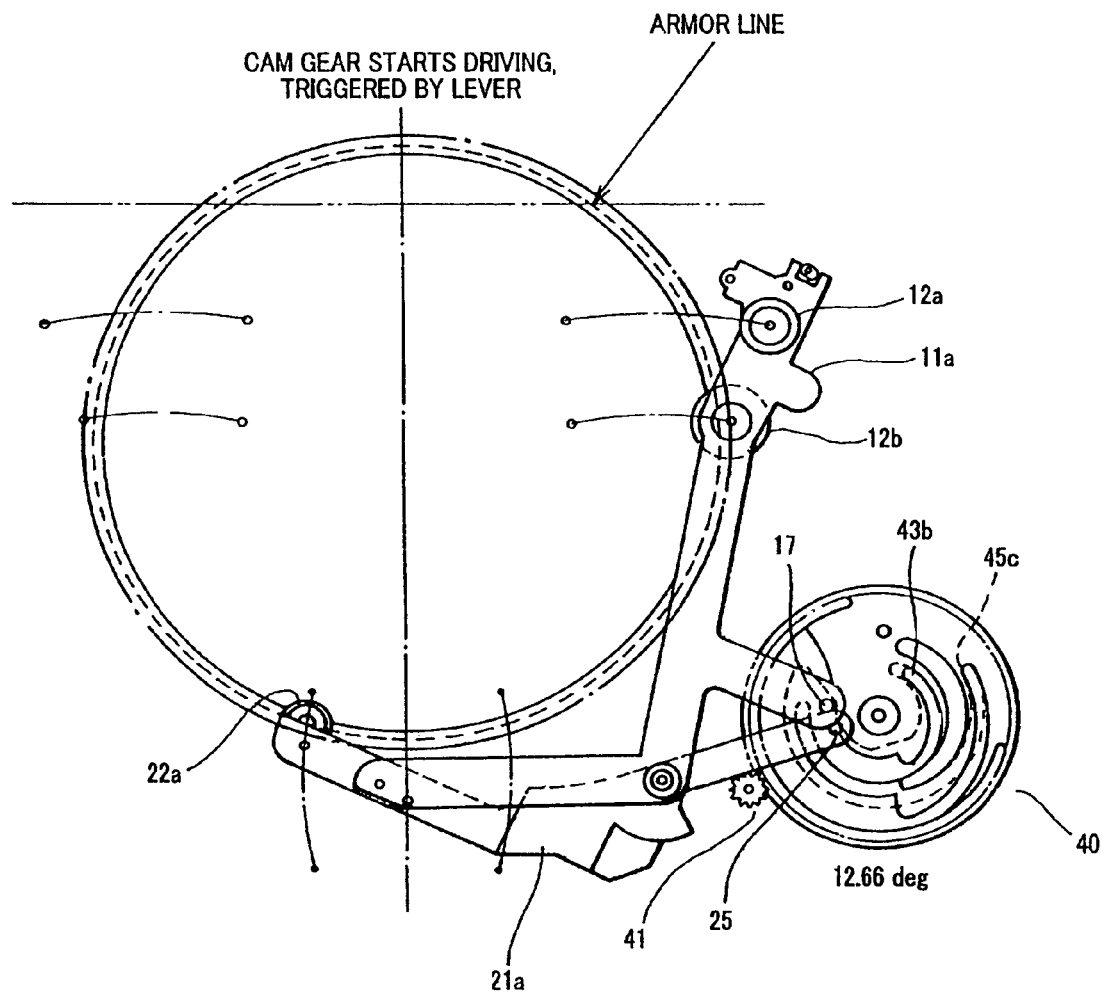
FIG. 8 is an explanatory view (part 2) showing an exemplary operation of the roller arm parts and the cam in the loading operation of the 12-cm disc, in the disc driving device shown in FIGS. 1A and 1B.
Figure 9:
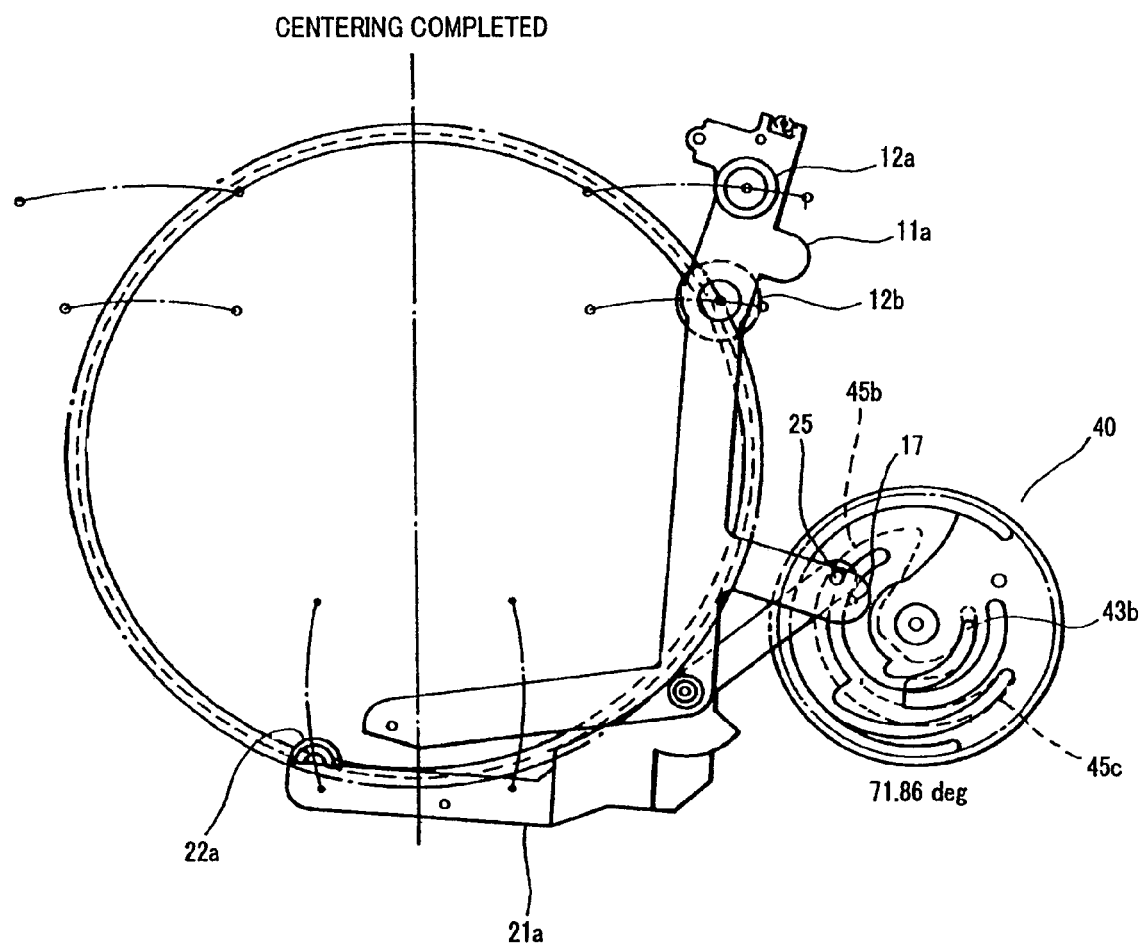
FIG. 9 is an explanatory view (part 3) showing an exemplary operation of the roller arm parts and the cam in the loading operation of the 12-cm disc, in the disc driving device shown in FIGS. 1A and 1B.
Figure 10:
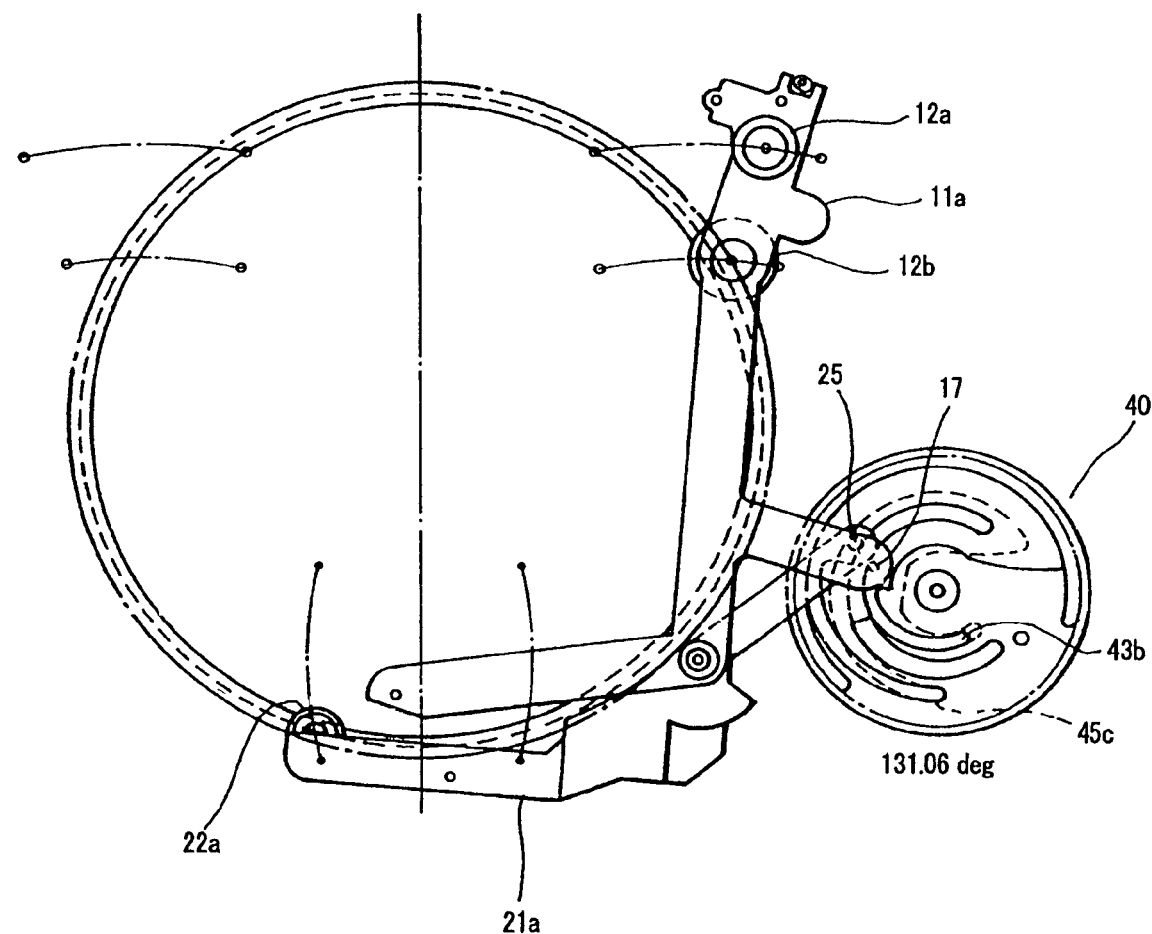
FIG. 10 is an explanatory view (part 4) showing an exemplary operation of the roller arm parts and the cam in the loading operation of the 12-cm disc, in the disc driving device shown in FIGS. 1A and 1B.
Figure 11:
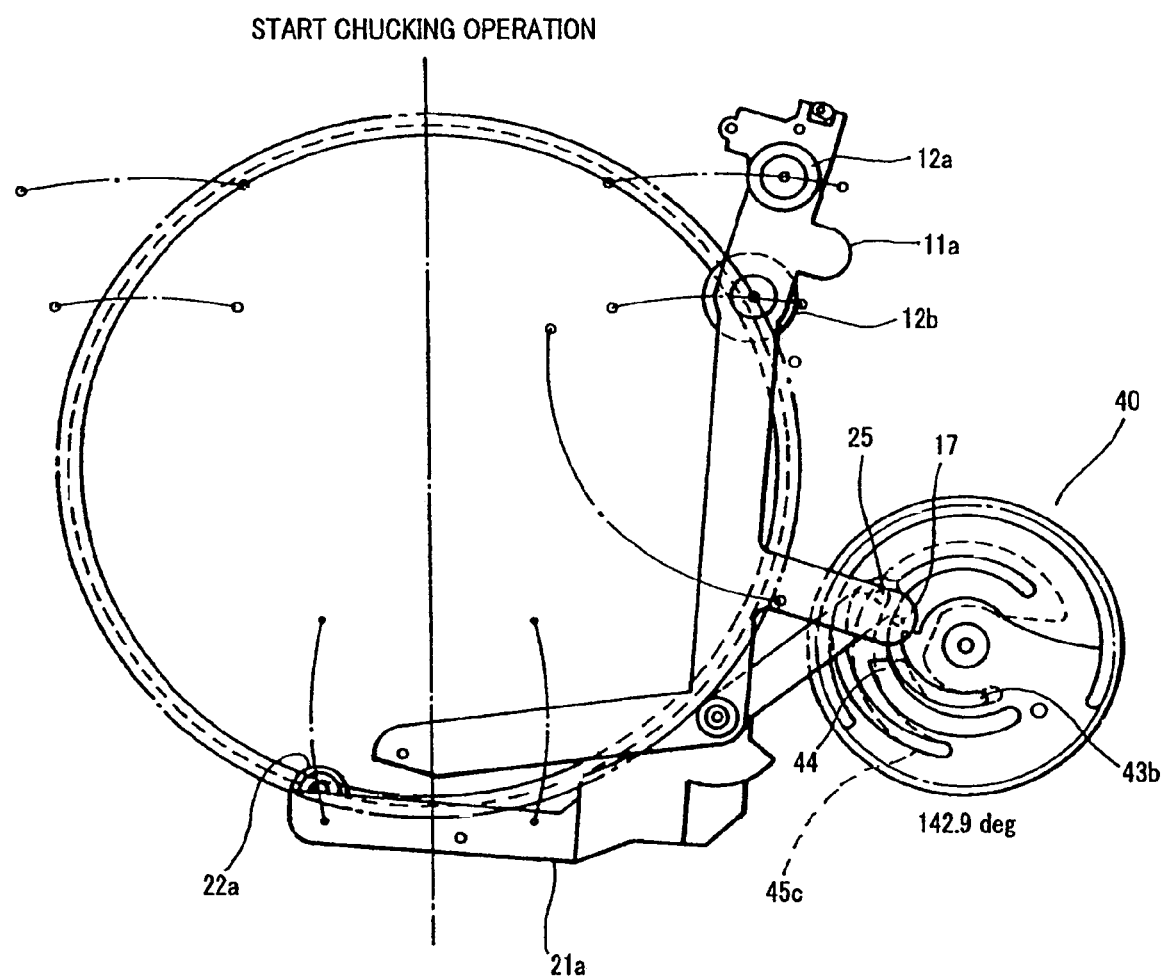
FIG. 11 is an explanatory view (part 5) showing an exemplary operation of the roller arm parts and the cam in the loading operation of the 12-cm disc, in the disc driving device shown in FIGS. 1A and 1B.
Figure 12:
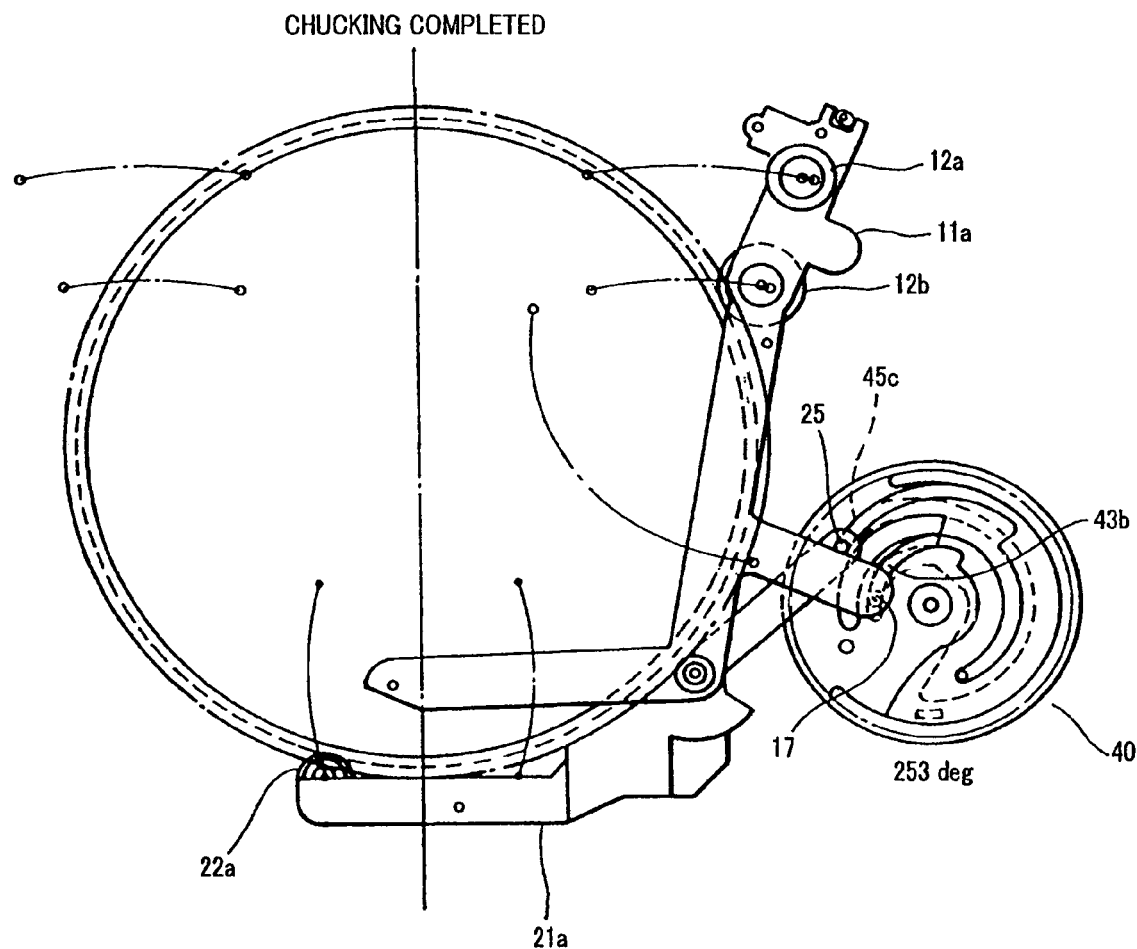
FIG. 12 is an explanatory view (part 6) showing an exemplary operation of the roller arm parts and the cam in the loading operation of the 12-cm disc, in the disc driving device shown in FIGS. 1A and 1B.

In this state, the 12-cm disc is supported at four points on its outer circumferential end part by the roller members 12b, 12d, 22a, 22b (see FIG. 7).

When the pair of roller arms 21a, 21b starts swaying, the swaying causes the guide boss 25 protruding from the roller arm 21a to move. By this movement, the guide boss 25 is abutted against the cam operation trigger cam groove part 45a of the cam groove 45 of the cam 40 and presses the cam operation trigger cam groove part 45a. The cam 40, which has been static, is pressed and rotated by the guide boss 25, and the cogs 41 provided on the outer circumference are meshed with the gear, which has been idling (see FIG. 8). That is, since the cam 40 pressed and rotated by the guide boss 25 causes the cogs 41 to be meshed with the gear, the rotational driving of the driving source is transmitted to the cam 40 and the cam 40 starts rotating (S106).

After the cam 40 starts rotating, the 12-cm disc is still transferred in the radial direction and the roller arms 11a, 11b, 21a, 21b continue swaying accordingly. When the guide boss 25 protruding from the roller arm 21a is abutted against the 12-cm disc centering cam groove part 45b of the cam groove 45 of the cam 40, the roller arms 21a, 21b stop swaying at that position (see FIG. 9). That is, as the guide boss 25 is abutted against the 12-cm disc centering cam groove part 45b, the roller arms 21a, 21b no longer sway. As the roller arms 21a, 21b stop swaying, also the roller arms 11a, 11b stop swaying. This ends the transfer of the 12-cm disc in the radial direction, and the 12-cm disc is rotating at the same position by the rotational driving of the roller member 12d. The stop position of the 12-cm disc in this case is the position where the center hole of the 12-cm disc can be engaged with the chucking member 32 of the chucking arm part 30 (hereinafter this position is referred to as "centering position"). That is, as the guide boss 25 is abutted against the 12-cm disc centering cam groove part 45b and the swaying of the roller arms 21a, 21b is regulated, the 12-cm disc is positioned at the centering position (S107).

In the disc driving device, the loading operation of the 12-cm disc inserted in the disc insertion/ejection port 1 from the disc insertion/ejection port 1 to the centering position is performed according to the above-described procedure. After the loading operation, the chucking operation is performed.

In the chucking operation, since the cam 40 continues rotating after the 12-cm disc is positioned at the centering position (see FIG. 10), the guide piece 35 of the chucking arm 31 of the chucking arm part 30, which has been moving toward the cam groove part 44 while being in contact with a chucking cam protrusion 46 according to the rotation of the cam 40, is engaged with the chucking cam groove part 44 of the cam 40, and this causes the chucking arm 31 to start swaying toward the spindle mechanism (S108). More specifically, as a predetermined time passes after the 12-cm disc is positioned at the centering position, that is, as the cam 40 rotated a predetermined angle, the position of the guide piece 35 shifts toward the spindle mechanism in accordance with the inclination of the chucking cam groove part 44. Thus, the chucking arm 31, which has been energized toward the spindle mechanism and retreated to a position where the 12-cm disc transferred by the loading operation and the chucking member 32 do not interfere with each other, starts swaying toward the spindle mechanism in accordance with the shift of the guide piece 35 (see FIG. 11).

When the chucking arm 31 sways according to the rotation of the cam 40 to a position where the chucking plate 32a of the chucking member 32 is perfectly engaged with the center hole of the 12-cm disc (position where they contact each other), the guide boss 17 of the roller arm 11a of the first roller arm part 10 is engaged with the 12-m disc chucking cam groove part 43b of the cam groove 43, on the face side of the cam 40, and the guide boss 25 of the roller arm 21a of the second roller arm part 20 is engaged with the 12-cm disc chucking cam groove part 45c of the cam groove 45, on the rear side of the cam 40. This causes the roller arms 11a, 11b, 21a, 21b to resume swaying (S109). In this case, however, the roller arms 11a, 11b, 21a, 21b sway in such a direction that the roller members 12b, 12d, 22a, 22b of the roller arms 11a, 11b, 21a, 21b, that is, the roller members 12b, 12d, 22a, 22b supporting the outer circumferential end part of the 12-cm disc at the four points, move away from the outer circumferential end part.

After the roller arms 11a, 11b, 21a, 21b resume swaying, the chucking arm 31 continues swaying toward the spindle mechanism in accordance with the rotation of the cam 40. As the roller arms 11a, 11b, 21a, 21b resume swaying, the roller members 12b, 12d, 22a, 22b, which have supported the outer circumferential end part of the 12-cm disc at the four points, move away from the outer circumferential end part. By these movements, the 12-cm disc positioned at the centering position by the loading operation is transferred substantially in the direction of the thickness of the disc according to the swaying of the chucking arm 31, with the center hole of the 12-cm disc engaged with the chucking plate 32a of the chucking member 32.

In this case, since the tapered parts 19, 27a are provided on the roller members 12b, 12d, 22a, 22b moving away from the outer circumferential end part of the 12-cm disc, the tapered parts 19a, 27a assist the transfer of the 12-cm disc. That is, the four points on the outer circumference of the 12-cm disc are guided by the tapered parts 19a, 27a and the 12-cm disc is transferred substantially in the direction of the thickness. Therefore, the attitude of the disc at the time of transfer is stabilized.

To securely realize the stable attitude, the swaying speed of the chucking arm 31 (i.e., the shape of the chucking cam groove part 44 of the cam 40), the swaying speed of the roller arms 11a, 11b, 21a, 21b after the resumption of the swaying (i.e., the shapes of the 12-cm disc chucking cam groove parts 43b, 45c of the cam 40), and the angle of inclination of the tapered parts 19a, 27a are synchronized.

Following the shape of the chucking cam groove part 44 of the cam 40, the chucking arm 31 sways to a state where a spindle hub (not shown) of the spindle mechanism and the chucking member 32 of the chucking arm part 30 can hold the 12-cm disc between them (S110). Moreover, following the shapes of the 12-cm disc chucking cam groove parts 43b, 45c of the cam 40, the roller arms 11a, 11b, 21a, 21b sway to positions where the roller members 12b, 12d, 22a, 22b are not in contact with the outer circumferential end part of the 12-cm disc (see FIG. 12). Since this enables the 12-cm disc to be rotated by the spindle mechanism, the disc driving device stops the rotational driving of the driving source and thus stops the rotation of the roller members 12c, 12d and the cam 40 (S111). The stop of the driving source may be triggered by a signal from a sensor for detecting disc chucking or a signal from a sensor from detecting the position of the cam 40, or by measuring time from the start of rotation of the driving source and determining the lapse of a predetermined time as a result of the measurement.

In the disc driving device, the chucking operation of the 12-cm disc positioned at the centering position in order to rotate the 12-cm disc by the spindle mechanism is performed according to the above-described procedure.

In the case of ejecting the chucked 12-cm disc from the disc insertion/ejection port 1, the above-described series of operations can be carried out entirely in the reverse order. Specifically, as the driving source is rotationally driven in the direction reverse to the direction of rotational driving in performing the loading operation first and the chucking operation next, the chucked 12-cm disc is transferred to the centering position. In this case, since the tapered parts 19a, 27a are provided on the roller members 12b, 12d, 22a, 22b, when the roller arms 11a, 11b, 21a, 21b sway in such a direction that the roller members 12b, 12d, 22a, 22b move closer to the outer circumferential end part of the 12-cm disc, the tapered parts 19a, 27a assist the transfer of the 12-cm disc substantially in the direction of the thickness. This enables the 12-cm disc to be transferred in the direction of the thickness. Then, the 12-cm disc situated at the centering position can be transferred to the disc insertion/ejection port 1 by the reverse rotation of the roller members 12c, 12d.

Figure 13:
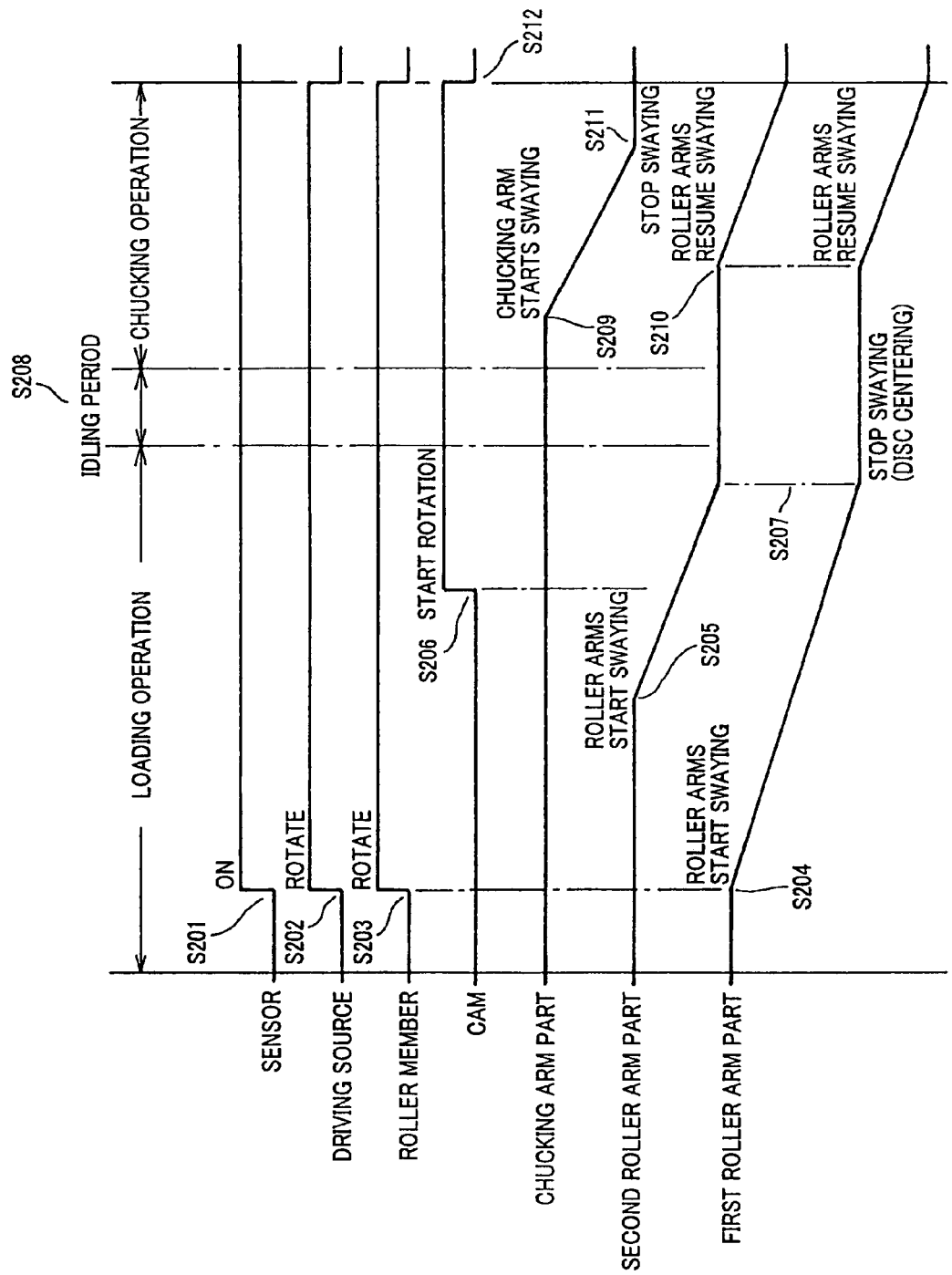
FIG. 13 is a timing chart showing an exemplary processing operation in the case of performing loading operation of an 8-cm disc inserted in a disc insertion/ejection port and then performing chucking operation, in the disc driving device shown in FIGS. 1A and 1B.

Now, the case of the 8-cm disc will be described. FIG. 13 is a timing chart showing an exemplary processing operation in performing loading operation of the 8-cm disc inserted in the disc insertion/ejection port 1 and the performing chucking operation. FIGS. 14 to 22 are explanatory views showing exemplary operations of the roller arm parts and the cam in the loading operation of the 8-cm disc. Also in FIGS. 14 to 22, the roller arms 11b, 21b that sway symmetrically synchronizing with the roller arms 11a, 21a are not shown.

As shown in FIG. 13, in the case of the 8-cm disc, detection of insertion of the disc by the photoelectric sensor 2 (S201), start of rotational driving of the driving source in response to the detection (S202), start of rotation of the roller members 12c, 12d via the belt 13 and the pulley 14 (S203) and continuation of static state of the cam 40 due to idling of the gear are totally the same as in the above-described case of the 12-cm disc.

The outer circumferential end part of the 8-cm disc inserted in the disc insertion/ejection port 1 is abutted against the circumferential parts 18 of the roller members 12b, 12d arranged corresponding to the 8-cm disc, of the roller members 12a to 12d of the first roller arm part 10, and the disc is supported by the circumferential parts 18. In this case, the 8-cm disc rotated about a supporting point formed by the fixed roller member 12b as its fulcrum and in accordance with the rotation of the roller member 12d. Therefore, the pair of roller arms 11a, 11b starts swaying while symmetrically synchronizing with each other with reference to the center of the 8-cm disc (S204). These actions start the loading operation of the 8-cm disc and cause the 8-cm disc to be transferred in the radial direction with reference to its center, from the disc insertion/ejection port 1 toward the spindle mechanism.

Also in this case, since the start of rotational driving of the driving source is triggered by the detection of disc insertion by the photoelectric sensor 2, good operability for a person who inserts the disc can be realized, as in the case of the 12-cm disc.

After that, as the driving source continues rotational driving and the transfer of the 8-cm disc in the radial direction is continued, the outer circumferential end part of the 8-cm disc is abutted against the circumferential parts 26 of the roller members 22a, 22b of the second roller arm part 20. Then, as the transfer of the 8-cm disc in the radial direction is still continued by the rotational driving of the driving source after the abutment, the roller members 22a, 22b are pressed toward the transfer direction by the outer circumferential end part of the 8-cm disc. This causes the pair of roller arms 21a, 21b to sway synchronizing substantially symmetrically with reference to the center of the 8-cm disc (S205).

Figure 14:
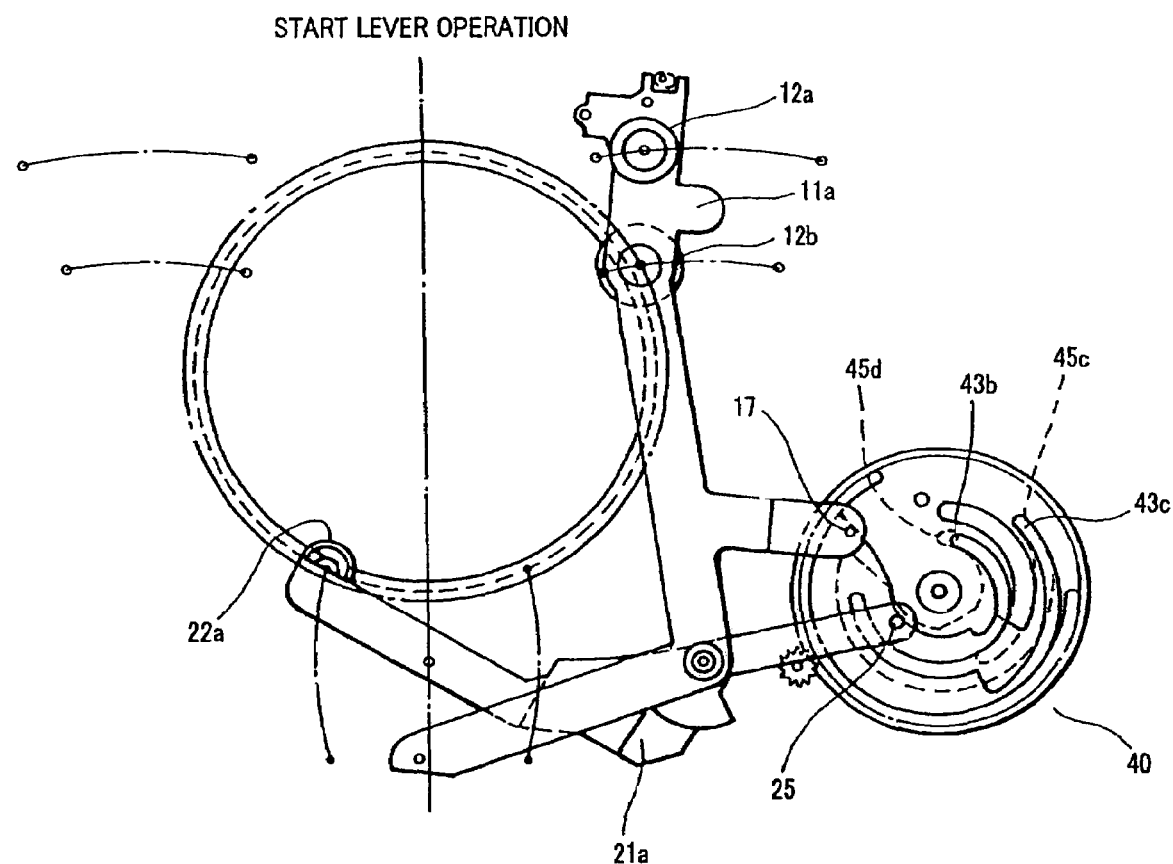
FIG. 14 is an explanatory view (part 1) showing an exemplary operation of the roller arm parts and the cam in the loading operation of the 8-cm disc, in the disc driving device shown in FIGS. 1A and 1B.
Figure 15:
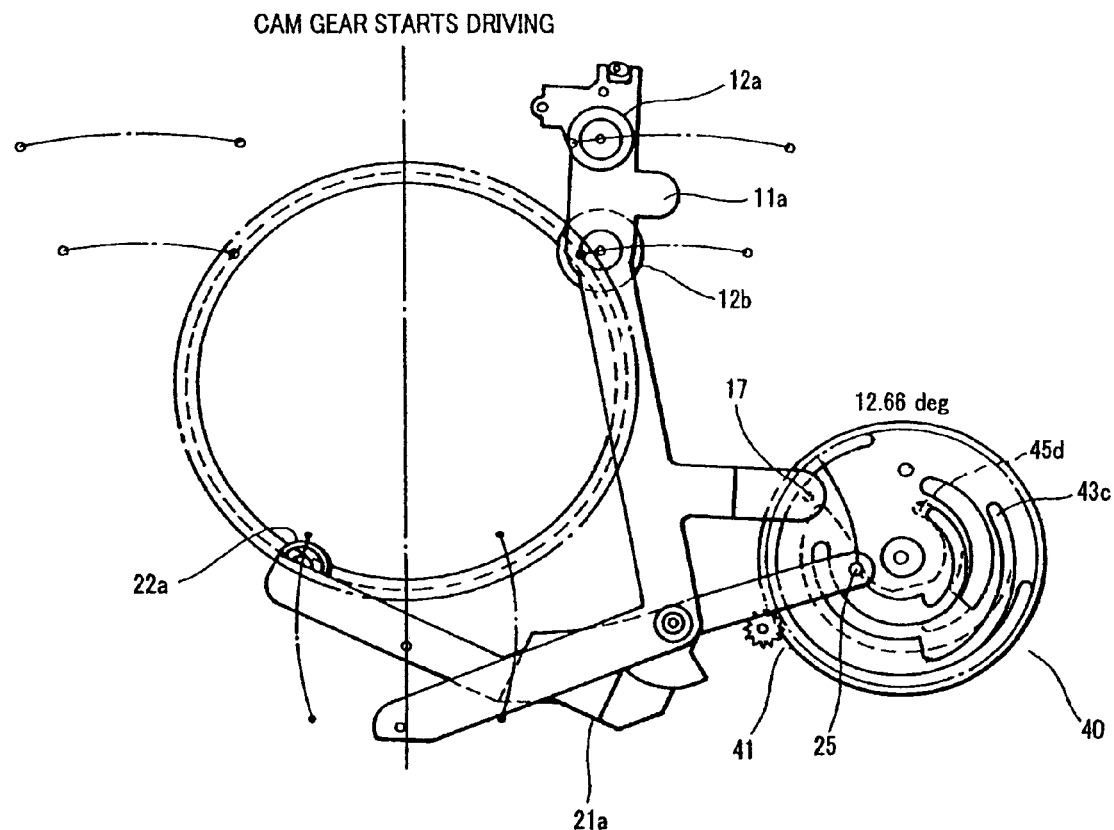
FIG. 15 is an explanatory view (part 2) showing an exemplary operation of the roller arm parts and the cam in the loading operation of the 8-cm disc, in the disc driving device shown in FIGS. 1A and 1B.
Figure 16:
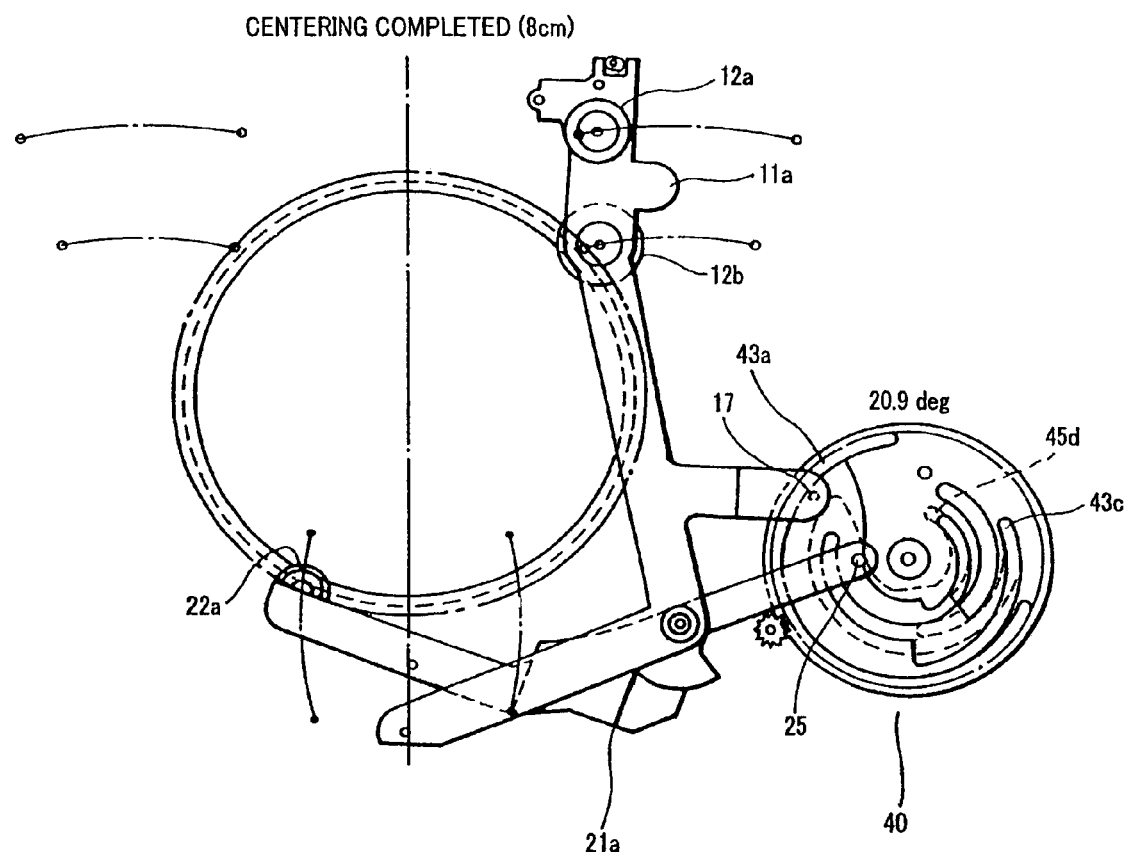
FIG. 16 is an explanatory view (part 3) showing an exemplary operation of the roller arm parts and the cam in the loading operation of the 8-cm disc, in the disc driving device shown in FIGS. 1A and 1B.
Figure 17:
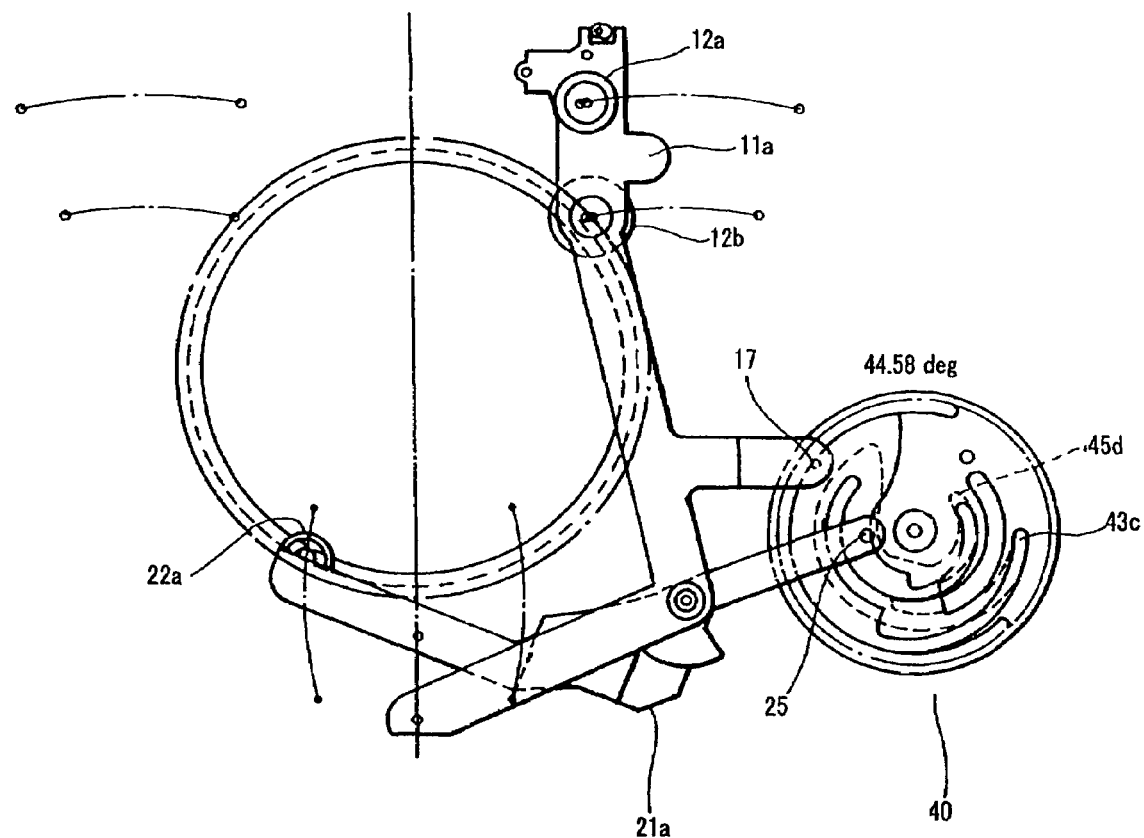
FIG. 17 is an explanatory view (part 4) showing an exemplary operation of the roller arm parts and the cam in the loading operation of the 8-cm disc, in the disc driving device shown in FIGS. 1A and 1B.
Figure 18:
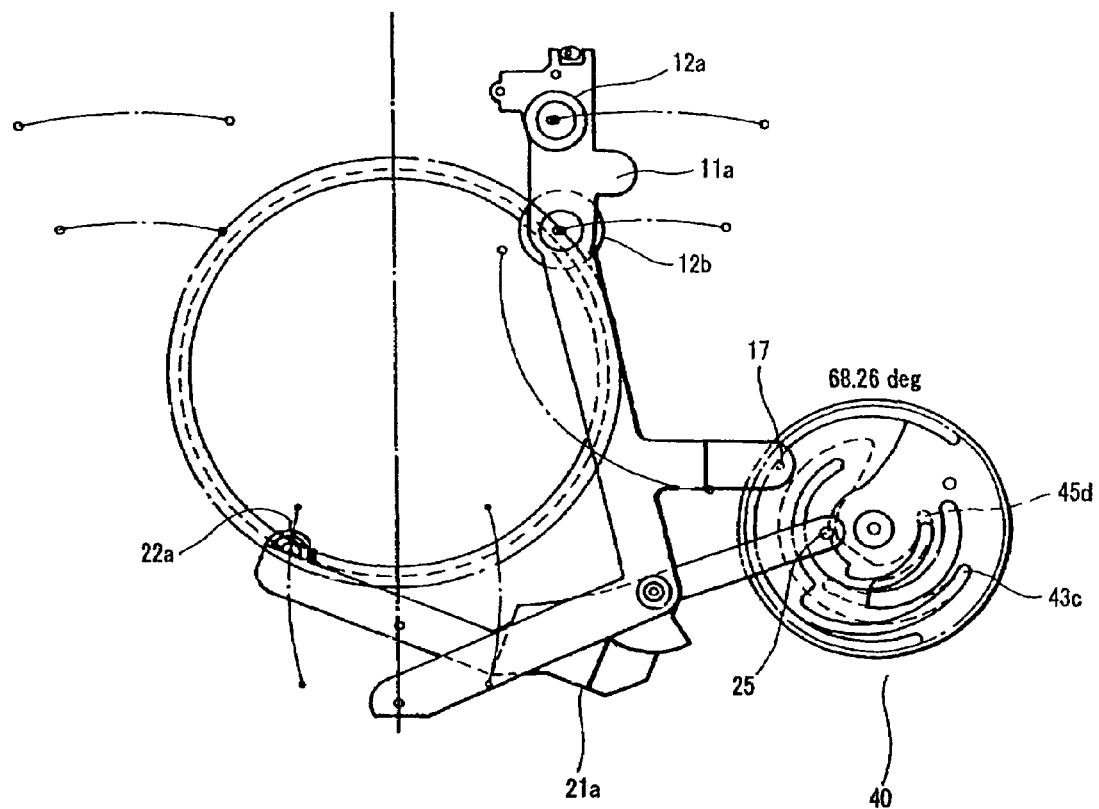
FIG. 18 is an explanatory view (part 5) showing an exemplary operation of the roller arm parts and the cam in the loading operation of the 8-cm disc, in the disc driving device shown in FIGS. 1A and 1B.
Figure 19:
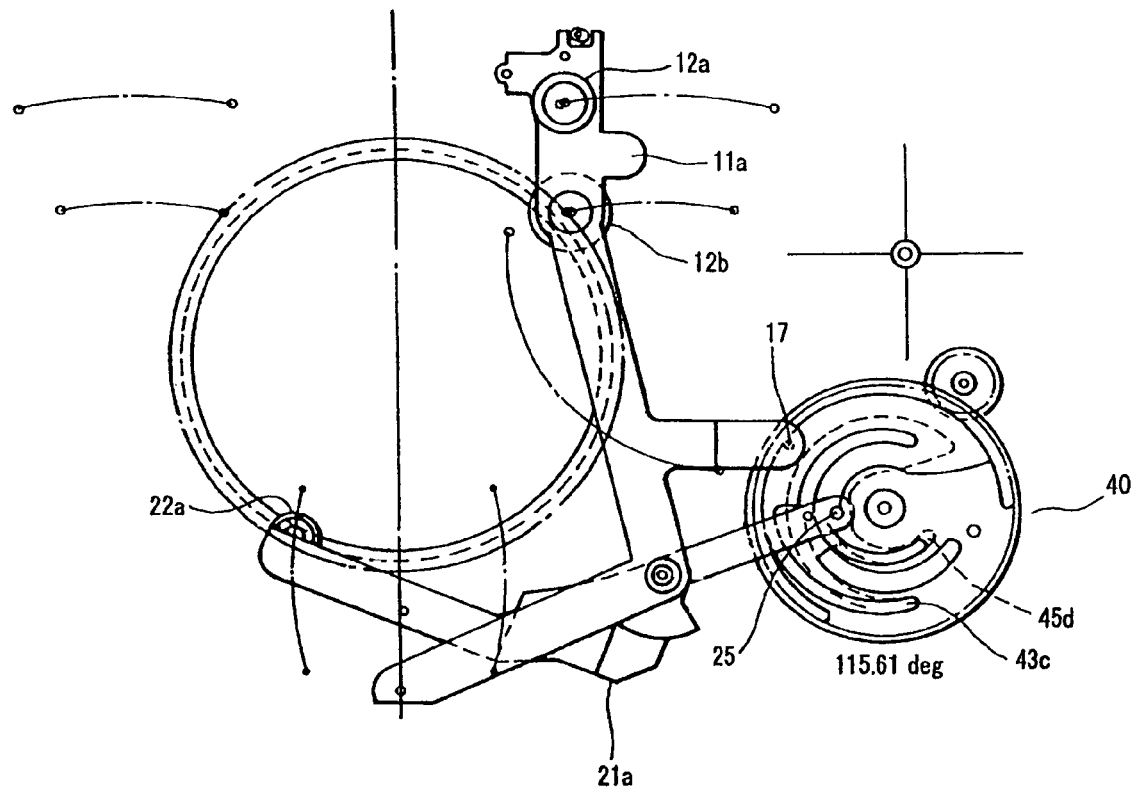
FIG. 19 is an explanatory view (part 6) showing an exemplary operation of the roller arm parts and the cam in the loading operation of the 8-cm disc, in the disc driving device shown in FIGS. 1A and 1B.
Figure 20:
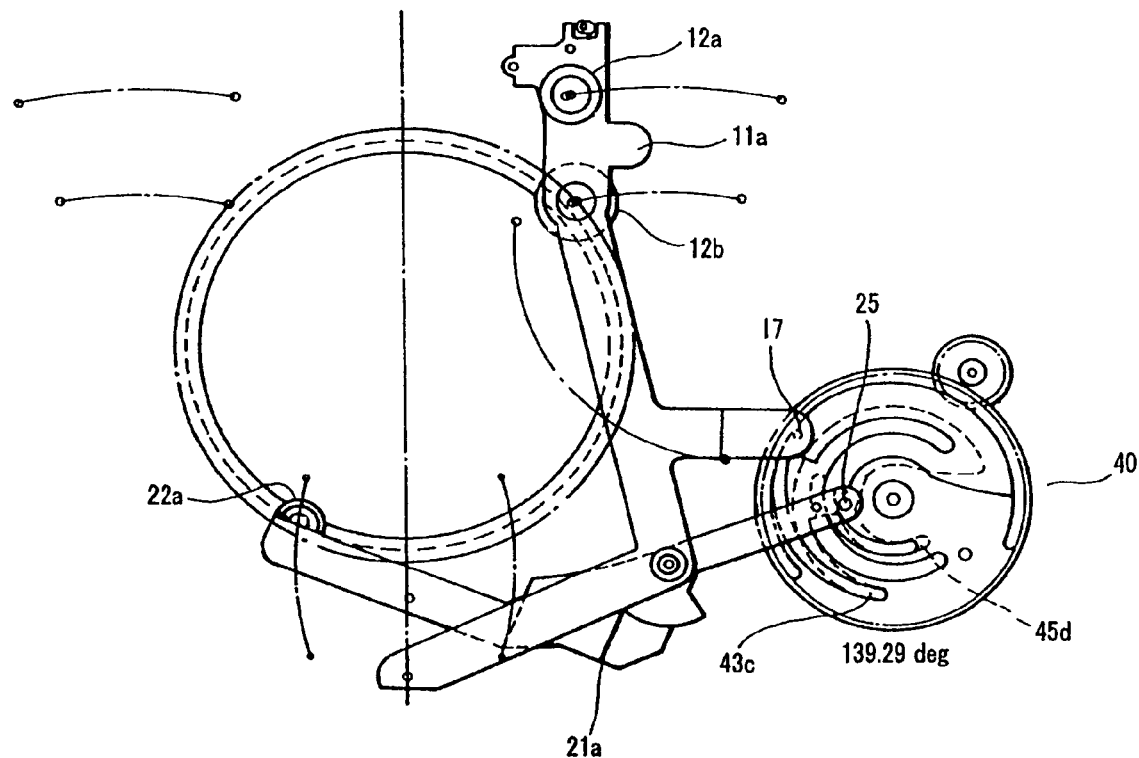
FIG. 20 is an explanatory view (part 7) showing an exemplary operation of the roller arm parts and the cam in the loading operation of the 8-cm disc, in the disc driving device shown in FIGS. 1A and 1B.
Figure 21:
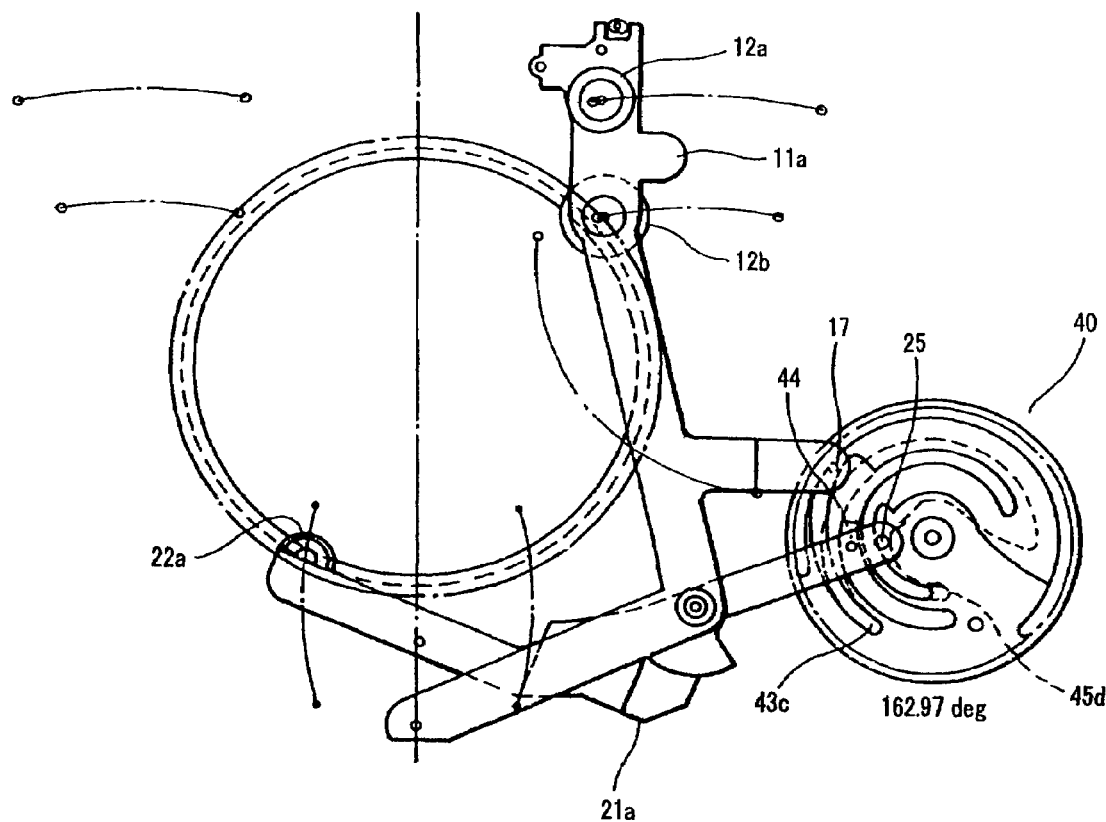
FIG. 21 is an explanatory view (part 8) showing an exemplary operation of the roller arm parts and the cam in the loading operation of the 8-cm disc, in the disc driving device shown in FIGS. 1A and 1B.
Figure 22:
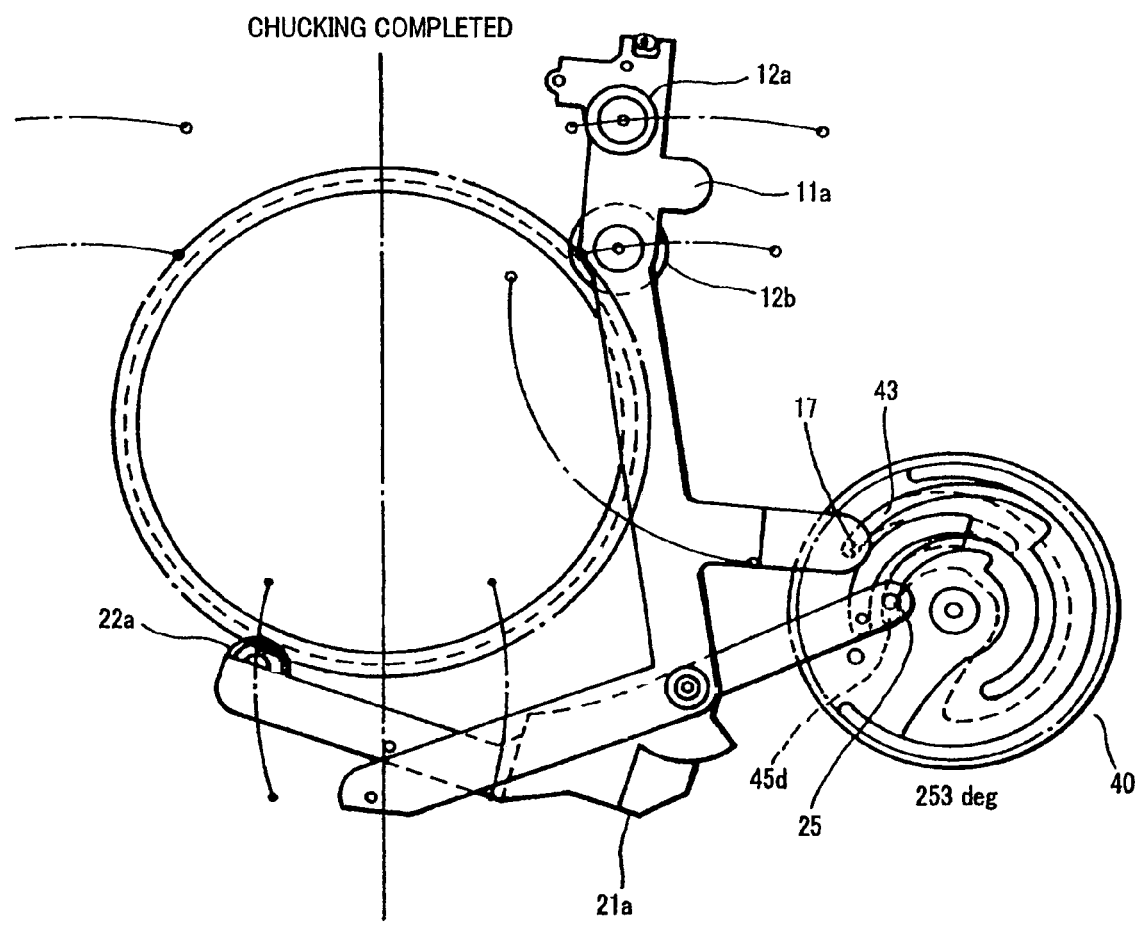
FIG. 22 is an explanatory view (part 9) showing an exemplary operation of the roller arm parts and the cam in the loading operation of the 8-cm disc, in the disc driving device shown in FIGS. 1A and 1B.

In this state, the 8-cm disc is supported at four points on its outer circumferential end part by the roller members 12b, 12d, 22a, 22b (see FIG. 14).

When the pair of roller arms 21a, 21b starts swaying, the swaying causes the guide boss 25 protruding from the roller arm 21a to move. By this movement, the guide boss 25 is abutted against the cam operation trigger cam groove part 45a of the cam groove 45 of the cam 40 and presses the cam operation trigger cam groove part 45a. The cam 40, which has been static, is pressed and rotated by the guide boss 25, and the cogs 41 provided on the outer circumference are meshed with the gear, which has been idling (see FIG. 15). Therefore, the rotational driving of the driving source is transmitted to the cam 40 and the cam 40 starts rotating (S206).

After the cam 40 starts rotating, the 8-cm disc is still transferred in the radial direction and the roller arms 11a, 11b, 21a, 21b continue swaying accordingly. When the guide boss 17 protruding from the roller arm 11a is abutted against the 8-cm disc centering cam groove part 43a of the cam groove 43 of the cam 40, the roller arms 11a, 11b stop swaying at that position (see FIG. 16). That is, as the guide boss 17 is abutted against the 8-cm disc centering cam groove part 43a, the roller arms 11a, 11b no longer sway. As the roller arms 11a, 11b stop swaying, also the roller arms 21a, 21b stop swaying. In this manner, as the guide boss 17 is abutted against the 8-cm disc centering cam groove part 43a and the swaying of the roller arms 11a, 11b is regulated, the 8-cm disc is positioned at the centering position (S207).

In the case of the 12-cm disc, the regulation of swaying of the roller arms 21a, 21b, that is, the state where the roller arms 21a, 21b no longer sway toward the back, is realized by the cam groove 45 and the 12-cm disc is positioned at the centering position. The operation in the case of the 8-cm disc is different from the operation in the case of the 12-cm disc in that the regulation of swaying of the roller arms 11a, 11b, that is, the state where the roller arms 11a, 11b no longer sway toward the back, is realized by the cam groove 43 and the 8-cm disc is positioned at the centering position. However, the correspondence between the diameter of disc and the roller arms 11*a*, 11*b*, 21*a*, 21*b* regulated in swaying is not limited to the above-described mode. As long as the disc can be positioned at the centering position by the regulation of swaying by the cam 40, for example, the correspondence may be reverse to the above-described mode. Alternatively, the same roller arms may be regulated in swaying, both in the case of the 8-cm disc and in the case of the 12-cm disc.

In the disc driving device, the loading operation of the 8-cm disc inserted in the disc insertion/ejection port 1 from the disc insertion/ejection port 1 to the centering position is performed according to the above-described procedure.

However, since the 8-cm disc has a smaller diameter than the 12-cm disc, it takes shorter to transfer the 8-cm disc from the disc insertion/ejection port 1 to the centering position than to transfer the 12-cm disc. That is, the 8-cm disc is positioned at the centering position faster than the 12-cm disc. On the other hand, timing for starting the chucking operation is the same, whether it is the 12-cm disc or the 8-cm disc. Therefore, in the case of the 8-cm disc, when the loading operation ends, the chucking operation is performed after an idling period of the cam 40 (S208). The idling period of the cam 40 is for offsetting the difference in time required for centering the disc. During this period, the roller arm 11*a*, 11*b*, 21*a*, 21*b* and the chucking arm 31 do not sway even if the cam 40 rotates (see FIGS. 17 to 20).

In the chucking operation after the idling period of the cam 40, the guide piece 35 of the chucking arm 31 of the chucking arm part 30 is engaged with the chucking cam groove part 44 of the cam 40, and the position of the guide piece 35 shifts toward the spindle mechanism in accordance with the inclination of the chucking cam groove part 44. Thus, the chucking arm 31 starts swaying toward the spindle mechanism in accordance with the shift of the guide piece 35 (S209) (see FIG. 21).

When the chucking arm 31 sways according to the rotation of the cam 40 to a position where the chucking plate 32*a* of the chucking member 32 is perfectly engaged with the center hole of the 8-cm disc (position where they contact each other), the guide boss 17 of the roller arm 11*a* of the first roller arm part 10 is engaged with the 8-cm disc chucking cam groove part 43*c* of the cam groove 43, on the face side of the cam 40, and the guide boss 25 of the roller arm 21*a* of the second roller arm part 20 is engaged with the 8-cm disc chucking cam groove part 45*d* of the cam groove 45, on the rear side of the cam 40. That is, since the positions of the roller arms 11*a*, 11*b*, 21*a*, 21*b* after the end of the loading operation in the case of the 12-cm disc are different from their positions in the case of the 8-cm disc because of the difference in diameter between the two discs, in the case of the 8-cm disc, the guide bosses 17, 25 are engaged with the cam grooves 43*c*, 45*d* that are different from the cam grooves in the case of the 12-cm disc. This causes the roller arms 11*a*, 11*b*, 21*a*, 21*b* to resume swaying (S210). Also in this case, the roller arms 11*a*, 11*b*, 21*a*, 21*b* sway in such a direction that the roller members 12*b*, 12*d*, 22*a*, 22*b* of the roller arms 11*a*, 11*b*, 21*a*, 21*b*, that is, the roller members 12*b*, 12*d*, 22*a*, 22*b* supporting the outer circumferential end part of the 8-cm disc at the four points, move away from the outer circumferential end part, as in the case of the 12-cm disc.

As the roller arms, 11*a*, 11*b*, 21*a*, 21*b* resume swaying and the chucking arm 31 sways toward the spindle mechanism, the 8-cm disc positioned at the centering position by the loading operation is transferred substantially in the direction of the thickness of the disc according to the swaying of the chucking arm 31 while being assisted by the tapered parts 19*a*, 27*a* of the roller members 12*b*, 12*d*, 22*a*, 22*b*, with the center hole of the 8-cm disc engaged with the chucking plate 32*a* of the chucking member 32. The chucking arm 31 sways to a state where the spindle hub of the spindle mechanism and the chucking member 32 of the chucking arm part 30 can hold the 8-cm disc between them (S211). Moreover, following the 8 cm disc chucking cam groove parts 43*c*, 45*d* of the cam 40, the roller arms 11*a*, 11*b*, 21*a*, 21*b* sway to positions where the roller members 12*b*, 12*d*, 22*a*, 22*b* are not in contact with the outer circumferential end part of the 8-cm disc (see FIG. 22). Since this enables the 8-cm disc to be rotated by the spindle mechanism, the disc driving device stops the rotational driving of the driving source and thus stops the rotation of the roller members 12*c*, 12*d* and the cam 40 (S212). The trigger to stop the driving source is the same as in the case of the 12-cm disc.

In the disc driving device, the chucking operation of the 8-cm disc positioned at the centering position in order to rotate the 8-cm disc by the spindle mechanism is performed according to the above-described procedure.

In the case of ejecting the chucked 8-cm disc from the disc insertion/ejection port 1, the above-described series of operations can be carried out entirely in the reverse order, as in the case of the 12-cm disc.

As described above, the disc driving device according to this embodiment has the cam 40 rotationally driven by the same driving source as that of the roller members 12*c*, 12*d*, and the cam 40 has the cam groove 43 including the 12-cm disc centering cam groove part 43*a*, the cam groove 45 including the 12-cm disc centering cam groove part 45*b*, and the chucking cam groove part 44. As the cam groove parts 43*a*, 45*b* regulate the swaying of the roller arms 11*a*, 11*b*, 21*a*, 21*b*, the disc transferred in the radial direction is positioned at the centering position. As the chucking cam groove 44 regulates the swaying of the chucking arm 31, the disc situated at the centering position is transferred substantially in the direction of the thickness. Therefore, in the disc driving device of the above-described structure, since the disc loading operation and the disc chucking operation can be performed as a series of operations by the same driving source, separate driving sources for the loading operation and for the chucking operation need not provided and miniaturization and reduction in thickness or the like of the device can be realized very easily. Moreover, since the common driving source can be used for the loading operation and the chucking operation, reduction in the number of components can be realized and reduction in cost can be realized as well as miniaturization and reduction in thickness or the like of the device.

Also, in the disc driving device described in this embodiment, the cam grooves 43, 45 provided on the cam 40 include the plural cam groove parts 43*b*, 43*c*, 45*c*, 45*d* corresponding to different disc diameters. Therefore, even if the cam 40 is provided and the loading operation and the chucking operation share the common driving source, the loading operation and the chucking operation can be carried out similarly for both the 12-cm disc and the 8-cm disc. Moreover, since the cam groove parts 43*b*, 43*c*, 45*c*, 45*d* are provided according to the different positions of the roller arms 11*a*, 11*b*, 21*a*, 21*b* corresponding the difference diameters of the 12-cm disc and the 8-cm disc, a sensor or the like for identifying the 12-cm disc and the 8-cm disc can be omitted. This means that the different disc sizes, that is, 12-cm disc and 8-cm disc, can be identified simply from the positions of the roller arms 11*a*, 11*b*, 21*a*, 21*b* without requiring a sensor or the like. That is, in the disc driving device, the 12-cm disc and the 8-cm disc can be identified without requiring a dedicated sensor or the like.

While the 12-cm disc and the 8-cm disc are used as examples in this embodiment, this invention is not limited to this embodiment. Specifically, the disc driving device can handle a disc with a diameter other than 12 cm or 8 cm, and handling of three or more types of discs can be considered, depending on the number of cam groove parts provided on the cam 40.

Moreover, in the disc driving device described in this embodiment, the tapered parts 19a, 27a of the roller members 12a to 12d, 22a, 22b assist the transfer of the disc substantially in the direction of the thickness. Therefore, when transferring the disc toward the spindle mechanism, the outer circumference of the disc is guided by the tapered parts 19a, 27a and the attitude of the disc at the time of transfer can be thus stabilized. Also, the existence of the tapered parts 19a, 27a enables transfer of the disc in the reverse direction from the spindle mechanism side.

While the invention has been described in accordance with a certain preferred embodiment thereof illustrated in the accompanying drawings and described in the above description in detail, it should be understood by those ordinarily skilled in the art that the invention is not limited to the embodiment, but various modifications, alternative constructions or equivalents can be implemented without departing from the scope and spirit of the present invention as set forth and defined by the appended claims.

What is claimed is:

1. A recording medium driving apparatus comprising:
   a disc insertion/ejection port;
   first and second recording medium supporting members disposed in the vicinity of the disc insertion/ejection port, said first recording medium supporting member having two disc support portions, and said second recording medium supporting member having two disc support portions;
   a third recording medium supporting member disposed remotely from the disc insertion/ejection port and having two disc support portions; and
   a recording medium chucking member operable to move to a holding position for holding said disc;
   wherein said support portions move to support said disc when said recording medium chucking member commences operation to hold said disc.

2. The apparatus according to claim 1, further comprising a driving force for driving a support portion of one of said recording medium supporting members.

3. The apparatus according to claim 2, wherein the other support portion of said one recording medium supporting member is fixed thereon without rotating, and said disc rotates about a support point established by said fixed supporting portion as its fulcrum.

4. The apparatus according to claim 2, further comprising a sensor to detect the insertion of said disc and to trigger said driving force, thereby starting a disc-loading operation.

5. The apparatus according to claim 2, further comprising a belt and pulley arrangement for transmitting said driving force to the driven support portion.

6. The apparatus according to claim 1, further comprising a driving force for driving a respective support portion in each of said first and second recording medium supporting members.

7. The apparatus according to claim 1, further comprising a belt and pulley arrangement for transmitting said driving force to said respective support portions.

8. The apparatus according to claim 1, wherein said support portions of said first and second recording medium supporting members exhibit respective arrangement pitches, and the arrangement pitch of the support portions of said first recording medium supporting member is different from the arrangement pitch of the support portions of said second recording medium supporting member.

9. The apparatus according to claim 1, wherein said third recording medium supporting member is movable; and further comprising a controlling member for stopping movement of said third recording medium supporting member.

10. The apparatus according to claim 1, further comprising a controlling member for moving said support portions away from said disk.

11. The apparatus according to claim 1, wherein said support portions are positionable; and further comprising a controlling member for controlling the position of the support portions according to the size of said disc.

* * * * *